(12) United States Patent
Dyon et al.

(10) Patent No.: US 10,523,678 B2
(45) Date of Patent: Dec. 31, 2019

(54) SYSTEM AND METHOD FOR ARCHITECTURE INITIATED NETWORK ACCESS CONTROL

(71) Applicants: Sean Dyon, Carnegie, PA (US); Melissa Dyon, Carnegie, PA (US)

(72) Inventors: Sean Dyon, Carnegie, PA (US); Melissa Dyon, Carnegie, PA (US)

( * ) Notice: Subject to any disclaimer, the term of this patent is extended or adjusted under 35 U.S.C. 154(b) by 243 days.

(21) Appl. No.: 15/333,247

(22) Filed: Oct. 25, 2016

(65) Prior Publication Data
US 2018/0115554 A1    Apr. 26, 2018

(51) Int. Cl.
*H04L 29/06* (2006.01)
*H04L 12/46* (2006.01)
*H04L 29/08* (2006.01)

(52) U.S. Cl.
CPC ........ *H04L 63/102* (2013.01); *H04L 12/4641* (2013.01); *H04L 63/0272* (2013.01); *H04L 63/164* (2013.01); *H04L 63/166* (2013.01); *H04L 63/083* (2013.01); *H04L 63/0861* (2013.01); *H04L 67/42* (2013.01); *H04L 69/325* (2013.01); *H04L 69/326* (2013.01); *H04L 2463/082* (2013.01)

(58) Field of Classification Search
CPC .............. H04L 63/102; H04L 12/4641; H04L 63/0272; H04L 63/083; H04L 63/0861; H04L 63/166; H04L 67/141; H04L 67/42; H04L 69/325; H04L 69/326
USPC .......................................................... 726/4
See application file for complete search history.

(56) References Cited

U.S. PATENT DOCUMENTS 8,886,948 B2   11/2014 Schmidt et al.
9,077,772 B2   7/2015 Hui et al.
(Continued)

OTHER PUBLICATIONS

"Dissecting the Pass the Hash Attack," Sander, Chris, Jul. 21, 2010, http://www.windowsecurity.com.
(Continued)

*Primary Examiner* — Michael Pyzocha
*Assistant Examiner* — Zoha Piyadehghibi Tafaghodi
(74) *Attorney, Agent, or Firm* — IP Law Leaders PLLC

(57) ABSTRACT

A system and method are provided for authenticating a user using a client side server within a computer network, the computer network operating in conformance with an open source initiative (OSI) model of structuring protocol data unit messages, the method comprising: generating a connection request at a client side server, the connection request including (i) a client side network layer protocol address information for use in a network layer (L3) protocol data unit (PDU), and (ii) a client side transport layer protocol address information for use in a transport layer (L4) PDU; transmitting the connection request from the client side server using both the network layer and the transport layer; receiving at the client side server an authentication call message on both the network and transport layers using the client side network layer protocol address information and client side transport layer protocol address information; transmitting user authentication information in response to the received authentication call message; and receiving connection confirmation based on the transmitted user authentication information confirming the user is authenticated to access protected systems.

20 Claims, 12 Drawing Sheets

(56) References Cited

U.S. PATENT DOCUMENTS

| | | | |
|---|---|---|---|
| 9,100,371 B2* | 8/2015 | Bagepalli | H04L 63/166 |
| 9,237,015 B2 | 1/2016 | McGrew et al. | |
| 9,344,421 B1 | 5/2016 | Chen et al. | |
| 2005/0055570 A1* | 3/2005 | Kwan | H04L 63/08 |
| | | | 726/4 |
| 2006/0130126 A1* | 6/2006 | Touve | H04L 63/0815 |
| | | | 726/5 |
| 2008/0077791 A1* | 3/2008 | Lund | H04L 9/3273 |
| | | | 713/156 |
| 2012/0260088 A1* | 10/2012 | Fries | H04L 63/168 |
| | | | 713/155 |
| 2015/0121500 A1* | 4/2015 | Venkatanaranappa | |
| | | | H04L 63/0815 |
| | | | 726/8 |
| 2015/0222435 A1 | 8/2015 | Lea | |
| 2015/0244711 A1 | 8/2015 | Venkataraman et al. | |
| 2016/0149869 A1 | 5/2016 | Selander | |

OTHER PUBLICATIONS

"Introduction to Jason Web Tokens," Sep. 24, 2016, https://jwt/io/introduction.

"An Introduction to Open ID Connect," Perera, Ashansa, Jul. 3, 2014, http://wso2.com/library/articles/2014/06/ppenidconnect/.

"An Introduction to OAuth 2," Anicas, Mitchel, Jul. 21, 2014, Digital Ocean, Community, https://www.digitalocean.com/community/tutorials/an-introduction-to-oauth-2.

\* cited by examiner

1100

SYSTEM AND METHOD FOR ARCHITECTURE INITIATED NETWORK ACCESS CONTROL

BACKGROUND

Technical Field

The embodiments described herein relate generally to computer networks, and more specifically to systems, methods, and modes for establishing and using enhanced security protocols in computer networks.

Background Art

FIGS. 1A and 1B illustrate the implementation of specific network technologies that make the exchange of information relatively easy. However, such network technologies also make it relatively easy for "bad actors" with nefarious intent to steal that information, unless appropriate security measures are put into place. Most people today are aware of, and use, the internet. It is nearly ubiquitous in most if not all developed societies, and even in less developed societies there is a growing awareness of the usefulness of such technology. As people have become to rely more and more on use of the internet and other network technologies, however, problems, as briefly described above, have arisen. Such problems can be related, in many cases, to two broad ideas: authentication, and authorization.

Authentication generally means determining you are who you say you are, even though I cannot see you, speak to you, and/or hear you. I can only rely on information—digital information—that you provide to ensure that I can safely provide the information/access you seek. In most, if not all cases, both the "I" and "you" can more generally refer to an organization—a private company, government entity, among others, or a private individual person. Thus, authentication seeks to identify, with a great deal of accuracy, the identity of the actor seeking to acquire the protected information. Authorization is different: there may be different types of information that is protected, and you may not be authorized to access all of that information, but only certain, specific subsets of that information. For example, a user can access a webpage of their bank, but can only access their own checking or savings account information. The bank officer, however, can access his or her own checking or savings account information, but also that of any customer with whom the bank officer is dealing with, or has a good business reason for doing so. The following paragraphs provide background information as to the establishment and usage of networks that allow access to remotely located information that can be accessed by the network technologies that make use of such systems.

FIG. 1A illustrates a typical representation of the Open Systems Interconnect (OSI) model that characterizes and standardizes the communication functions of the telecommunication or computing system without regard to their underlying internal structure and technology. As those of skill in the art are no doubt familiar with, the OSI model 100 includes seven layers 102-114: physical layer L1 102; data link layer L2 104; network layer L3 106; transport layer L4 108; session layer L5 110; presentation layer L6 112; and application layer L7 114. In fulfillment of the dual purposes of clarity and brevity, and in view that those of skill in the art are very familiar with the OSI model, only a brief overview of the OSI model shall be included herein.

The lowest layer in the OSI model is physical layer 102. Physical layer 102 specifies or is concerned with the transmission and reception of the unstructured raw bit stream over a physical medium. As those of skill in the art can appreciate, when each layer is described, the description includes what the specifications are for each respective layer. That is, the definition of the physical layer describes the electrical/optical, mechanical, and functional interfaces to the physical medium that are required for communications. Physical layer 102 carries the signals for all of the higher layers. The specification of the physical layer 102 further provides for data encoding and other physical layer medium characteristics.

Data link layer L2 104, the next highest layer in OSI model 100, provides specifications to enable error-free transfer of data frames from one node to another over physical layer L1 102, allowing the layers above it to assume virtually error-free transmission over the link.

In order to provide such substantially error-free transmissions, data link layer 104 specifies such items as link establishment and termination, frame traffic control, frame sequencing, frame acknowledgment, frame delimiting, frame error checking, and media access management. Media access management determines when a node "has the right" to use the physical medium.

Network layer L3 106, the next highest layer in OSI model 100, provides specifications that controls the operation of the subnet, deciding which physical path the data should take based on network conditions, priority of service, and other factors. Network layer L3 106 controls routing, subnet traffic control, frame fragmentation, logical-physical address mapping, subnet usage accounting, and communications subnet information. This latter item provides specifications for headers so that the network layer software residing in the subnet intermediate systems can recognize them and use them to route data to the destination address. The specification of network layer L3 106 provides very important information in network building and transmission: network layer L3 106 relieves the upper layers of the need to know anything about the data transmission and intermediate switching technologies used to connect systems. The specifications of network layer L3 106 establishes, maintains, and terminates connections across the intervening communications facility (one or several intermediate systems in the communication subnet).

Transport layer L4 108, the next highest layer in OSI model 100, provides specifications that ensures that messages are delivered substantially error-free, in sequence, and with no losses or duplications. It relieves the higher layer protocols from any concern with the transfer of data between them and their peers. The size and complexity of a transport protocol depends on the type of service it can get from the network layer. For a reliable network layer with virtual circuit capability, a minimal transport layer L4 108 is required. If network layer L3 106 is unreliable and/or only supports datagrams, the transport protocol should include extensive error detection and recovery. Examples of the protocols or items specified in transport layer L4 108 include message segmentation, message acknowledgement, message traffic control, and session multiplexing, among others.

As those of skill in the art can appreciate, the three lower-most layers (L1 102, L2 104, and L3 106) are protocols that deal with the immediately adjacent node. However, beginning with transport layer L4 108 and higher, these layers are protocols are true "source to destination" or end-to-end layers, and are not concerned with the details of the underlying communications facility. Transport layer L4

108 software (and software above it) on the source station carries on a conversation with similar software on the destination station by using message headers and control messages.

Session layer L5 110, the next highest layer in OSI model 100, provides specifications that allows session establishment between processes running on different stations. Session layer L5 110 provides the protocols that allow for session establishment, maintenance and termination. This includes allowing two application processes on different machines to establish, use, and terminate a connection, which is called a session (e.g., every time you log onto a webpage, you are establishing a session). Session layer L5 110 further provides protocols for session support.

Presentation layer L6 112, the next highest layer in OSI model 100, provides specifications that formats the data to be presented to application layer L7 114, the highest layer. It should be noted that typically, for most users, application layer L7 114 is the only "layer" that is commonly interfaced by users. The protocols of presentation layer L6 112 can be viewed as the translator for the network. Presentation layer L6 112 protocols can translate data from a format used by application layer L7 114 into a common format at the sending station, then translate the common format to a format known to application layer L7 114 at the receiving station. The protocols of presentation layer L6 112 provide character code translation, data conversion, data compression, and, in some cases, data encryption.

Application layer L7 114 is the highest layer in OSI model 100; it provides specifications that serves as the window for users and application processes to access network services. Application layer L7 114 contains a variety of commonly needed functions, such as resource sharing and device redirection, remote file access, remote printer access, interprocess communications, network management, directory services, electronic messaging, and network virtual terminals, among others.

Attention is now directed to FIG. 1B. As described above, the OSI model 100 presents a standard data flow architecture, with protocols specified in such a way that the receiving layer at the destination computer receives exactly the same object as sent by the matching layer at the source computer. FIG. 1B illustrates one example of how data can flow in the OSI model.

Each layer of OSI model 100 can be thought of as protocols—a set of rules, paradigms, or a specification, which describes how the data is to be organized in order for it to be transmitted and received properly, based on the physical and electrical interactions of the network within which the data packets or messages are being transported across. In addition, as those of skill in the art can further appreciate, OSI model 100 and the separate layers can also be thought of as a set of separate programs or modules, each with an input and an output; in the case of application layer L7 114, its input is the output or data generated by the application layer L7 114 application or program that the user is interacting with. In FIG. 1B that output is represented as data packet 115. As those of skill in the art can further appreciate, the interactions between the different layers L1-L7 102-114 can be referred to as the sending process.

The sending process passes data 115 to application layer L7 114. Application layer L7 114 attaches application header 116 and then passes the frame (the frame is now the collection of grouping of application header 116 and data 115) to presentation layer L6 112. Presentation layer L6 112 can transform data in various ways, if necessary, such as by translating it and adding presentation header 118. It gives the result—the new packet (presentation header 118+application header 116+data 115=new packet) to session layer L5 110.

Presentation layer L6 112 is not aware of which portion (if any) of the data received from application layer L7 114 is application header 116 and which portion is actually user data 115, because that information is irrelevant to the presentation layer's L6 112 role. The same is true in regard to each layer; it treats the input as the "data" to which it applies its header, and passes it on to the next layer.

The process of adding headers is repeated from layer-to-layer until the frame reaches data link layer L2 104. There, in addition to data-link header 126, data-link trailer 128 is added. Data-link trailer 128 contains a checksum and padding if needed. This aids in frame synchronization. Frame 130—the collection of data 115, application header 116, presentation header 118, session header 120, transport header 122, network header 124, data-link header 126, and data-link trailer 128—is passed down to physical layer L1 102, where it is transmitted to the receiving computer. On the receiving computer, the various headers 116-126 and data-link trailer 128 are stripped off one-by-one as frame 130 ascends layers L1-L7 102-114 and finally reaches the receiving application/program/module.

When users of remote applications, such as those stored according to the protocols of the internet of things (IoT), attempt to use such applications, or access files remotely stored, the owners/operators of such applications of files typically require such users to access or engage in a virtual private network (VPN).

A VPN is a private network that extends across a public network or the internet. VPNs enable users to send and receive data across shared or public networks as if their computing devices were directly connected to the private network. Such private networks can include, for example, a company's private local area network (LAN), in which an electronic mail application can be used, such Microsoft Outlook, among others. Many people today are familiar with such LANs and, by extension, VPNs.

VPNs can provide functionality, security, and/or network management benefits to the user. As described above, some VPNs allow employees to securely access a corporate intranet while located outside the office, and some VPNs can securely connect geographically separated offices of an organization, creating one cohesive network.

As those of skill in the art can appreciate, a VPN can be created by establishing a virtual point-to-point connection through the use of dedicated connections, virtual tunneling protocols, or traffic encryption. A VPN available from the public Internet can provide some of the benefits of a wide area network (WAN). From a user perspective, the resources available within the private network can be accessed remotely.

It is known that while VPNs cannot make online connections completely anonymous, they can usually increase privacy and security. To prevent disclosure of private information, VPNs typically allow only authenticated remote access using tunneling protocols and encryption techniques, as mentioned above.

There are problems, however, with the security of VPNs, and other remote access applications. For example, some so-called "secure" VPN protocols include the use of Internet Protocol Security (IPsec) as initially developed by the Internet Engineering Task Force (IETF). However, such VPN protocols make use of OSI layer 2 tunneling protocols. Other VPN security protocols include transport layer security (layer 4 of the OSI model), which can tunnel an entire network's traffic, or secure an individual connection. Other access management solutions typically require a uniform resource locator (URL) to provide basic access management and access control to critical corporate resources. This means that by its very nature, these systems only protect web based applications. Authentication in this sense takes place at application layer 114, or layer 7 of the OSI model.

Today's security challenges have evolved where compromised credentials (i.e., authentication issues) are now the leading sources for breach related events. Organizations try to prevent these types of attacks from occurring on their network by using two (2) factor authentication.

As those of skill in the art can appreciate, Two Factor Authentication (TFA), is an extra layer of security that is known as "multi factor authentication" that requires not only a password and username, but also something that only the user knows. Such additional piece of information can be provided by a physical token, among other methods.

Using a username and password together with the additional piece of information that only the user knows makes it harder for potential intruders ("bad actors") to gain access and steal that person's personal data or identity.

Historically, TFA is not a new concept, but its use has become far more prevalent with the use of network technologies. Many people, however, probably do not know this type of security process is called TFA. Many banks have implemented different forms of TFA, including, for example, a personal identification number (PIN) or FOB. The PIN is a multi-digit numeric or alpha-numeric sequence, of different lengths, that the user provides when setting up an account. A FOB is a device that generates a random number that must be input along with the username and password, and which the organization can match with their own corresponding random number generator. Multi factor Authentication has also been described as the user providing "what they have" (their username and password) and "what they know" (the PIN or FOB-provided number sequence).

As those of skill in the art can appreciate, however, there is a negative effect to the use TFA: New hardware tokens (in the form of key fobs or card readers) need to be ordered, issued, and this can cause slowdowns and problems for a company's customers. Further, physical tokens (FOBs) are also usually small and easily lost so causing more problems for everyone when customers call in requesting new ones. Such tokens can, in some cases, be replace by purely electronic ones, such as Jason Web Tokens, discussed in greater detail below.

An additional challenge with implementing TFA is that in most cases, security is limited to web-based applications through the use of either federation protocols like SAML, WS-*, and OAuth, or through application firewalling (typically some form of proxy). As those of skill in the art can appreciate, federated identity management (FIdM) amounts to having a common set of policies, practices and protocols in place to manage the identity and trust into IT users and devices across organizations. TFA can provide additional security for applications that support federation protocols, but for those applications that do not have support, organizations utilize VPN or Proxy solutions to front end those applications. However, as the National Institute of Standards and Technology (NIST) discussed in their Digital Authentication Guideline, SP 800-63B, even TFA solutions are susceptible to compromise. Thus, those of skill in the art can appreciate that TFA, VPN, and Proxy solutions alone are no longer enough to protect organizations against the evolving threat landscape.

Further, existing Identity and access management platforms limit what can be protected typically to web based applications. Some legacy applications are required to use Remote Authentication Dial-in User Service (RADIUS), which is a networking protocol that provides centralized authentication, authorization, and accounting (AAA or Triple A) management. These style solutions do not provide the breath of support organizations are looking for, and typically require multiple products from multiple companies to provide as much coverage as possible. Organizations are also expanding their Internet of Things (IoT) footprint and need a reliable solution to help protect and prevent IoT devices from becoming the foot in the door bad actors need to penetrate and move laterally through the network.

There are certain problems, therefore, with the conventional systems described above that provide secure access to protected networks, and the applications, programs, and information stored therein. Accordingly, it would be desirable to provide methods, modes and systems for establishing and using enhanced security protocols in computer networks.

SUMMARY

An object of the embodiments is to substantially solve at least the problems and/or disadvantages discussed above, and to provide at least one or more of the advantages described below.

It is therefore a general aspect of the embodiments to provide a systems, modes, and methods for establishing and using enhanced security protocols for computer networks that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a method is provided for authenticating a user using within a computer network, the computer network operating in conformance with an open source initiative (OSI) model of structuring protocol data unit messages, the method comprising: generating a connection request at the client side server to create the VPN, the connection request including (i) a client side network layer protocol address information for use in a network layer (L3) protocol data unit (PDU), and (ii) a client side transport layer protocol address information for use in a transport layer (L4) PDU; transmitting the connection request from the client side server using both the network layer and the transport layer; receiving at the client side server an authentication call message on both the network and transport layers using the client side network layer protocol address information and client side transport layer protocol address information; transmitting user authentication information in response to the received authentication call message; and receiving connection confirmation based on the transmitted user authentication information confirming the user is authenticated to access protected systems.

According to the first aspect of the embodiments, the step of generating a connection request comprises: accessing a client side authentication application on the client side server by the user; obtaining a security token from the client side server through use of the client side authentication application; determining, by the client side authentication application, that the security token is valid and unexpired; and combining the valid, unexpired token with the connection request by the client side authentication application.

According to the first aspect of the embodiments, the step of receiving at the client side server an authentication call message comprises: receiving, at a gateway side server, the transmitted connection request; determining, by a gateway side authentication application, the (i) a client side network layer protocol address information for use in a network layer (L3) protocol data unit (PDU), and (ii) a client side transport layer protocol address information for use in a transport layer (L4) PDU; verifying token authentication of the user using the gateway side authentication application; generating the authentication call message; and transmitting the authentication call message to the client side authentication application on the client side server using both the network layer and transport layer according to the client side network layer protocol address information and client side transport layer protocol address information.

According to the first aspect of the embodiments, the step transmitting user authentication information in response to the received authentication call message comprises: requesting, by the client side authentication application, authentication information from the user; receiving as an input to a graphical user interface the authentication information from the user; and forwarding the same to the gateway side server using a completion of user authentication message.

According to the first aspect of the embodiments, the user authentication information comprises: at least one or more of a username, password, answers to one or more additional questions, and biometric information.

According to the first aspect of the embodiments, the method further comprises: receiving, by the gateway server and gateway authentication application, the authentication information transmitted by the client side server and client side authentication application; and forwarding, by the gateway side server and the gateway side authentication application, the connection request to one or more of the protected systems.

According to the first aspect of the embodiments, the method further comprises: completing connection confirmation between the one or more protected systems and the client side server.

According to the first aspect of the embodiments, a virtual private network (VPN) is created between the client side server, a gateway side server, and protected systems, the VPN being used to access protected systems by the client side server, and the VPN operating within a larger computer network.

According to a second aspect of the embodiments, a method is provided for authenticating access to computer network protected systems, the method comprising: determining that a user has a valid, non-expired token to allow access to the protected systems; granting access to the user to protected systems; and accessing the protected systems by the user, wherein the steps of determining that the user has a valid, non-expired token comprises—
generating a connection request at a client side server to access the protected systems, the connection request including (i) a client side network layer protocol address information for use in a network layer (L3) protocol data unit (PDU), and (ii) a client side transport layer protocol address information for use in a transport layer (L4) PDU; transmitting the connection request from the client side server using both the network layer and the transport layer; receiving at the client side server an authentication call message on both the client side network layer protocol address information and client side transport layer protocol address information; transmitting user authentication information in response to the received authentication call message; and receiving connection confirmation based on the transmitted user authentication information confirming the user is authenticated to access the protected systems.

According to the second aspects of the embodiments, the method further comprises: requesting authentication credentials from the user if the token is invalid or expired; and permitting access to the protected systems if the authentication credentials are correct.

According to the second aspects of the embodiments, the method further comprises: determining whether the user is an authorized user if the authentication credentials are correct by verifying additional information.

According to the second aspect of the embodiments, the additional information comprises: one or more of a password, username, biometric information, and one or more answers to one or more security questions.

According to a third aspect of the embodiments, network system is provided for authenticating a user of a computer network that operates in conformance with an open source initiative (OSI) model of structuring protocol data unit messages, the network system comprising: a client side server, adapted to store and run a client side authentication application, the client side authentication application adapted to generate a connection request at the client side server to access protected systems, the connection request including (i) a client side network layer protocol address information for use in a network layer (L3) protocol data unit (PDU), and (ii) a client side transport layer protocol address information for use in a transport layer (L4) PDU, the client side authentication application further adapted to transmit the connection request from the client side server using both the network layer and the transport layer; the client side authentication application further adapted to receive an authentication call message on both the network and transport layers using the client side network layer protocol address information and client side transport layer protocol address information, the client side authentication application further adapted to transmit user authentication information in response to the received authentication call message, and the client side authentication application further adapted to receive connection confirmation based on the transmitted user authentication information confirming the user is authenticated to access the protected systems.

According to the third aspect of the embodiments, client side authentication application further adapted to obtain a security token from the client side server; determine that the security token is valid and unexpired; and combine the valid, unexpired token with the connection request.

According to third aspect of the embodiments, the network system further comprises: a gateway side server adapted to include a gateway side authentication application, the gateway side authentication application adapted to receive the transmitted connection request, and determine the (i) a client side network layer protocol address information for use in a network layer (L3) protocol data unit (PDU), and (ii) a client side transport layer protocol address information for use in a transport layer (L4) PDU, the gateway side authentication application further adapted to verify the token authentication of the user, generate the authentication call message, and transmit the authentication call message to the client side authentication application on the client side server using both the network layer and transport layer according to the client side network layer protocol address information and client side transport layer protocol address information.

According to the third aspect of the embodiments, the client side authentication application further adapted to request authentication information from the user, receive, as an input to a graphical user interface, the authentication information from the user, and forward the same to the gateway side server using a completion of user authentication message.

According to the third aspect of the embodiments, the user authentication information comprises: at least one or more of a username, password, answers to one or more additional questions, and biometric information.

According to the third aspect of the embodiments, the gateway side authentication application is further adapted to receive the authentication information transmitted by the client side server and client side authentication application, and forward the connection request to one or more of the protected systems.

According to the third aspect of the embodiments, the client side server, client side authentication application, gateway side server, and gateway side authentication application are further adapted to complete connection confirmation between the one or more protected systems and the client side server.

According to the third aspect of the embodiments, a virtual private network (VPN) is created between the client side server, a gateway side server, and protected systems, the VPN being used to access protected systems by the client side server, and the VPN operating within a larger computer network.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified, and wherein.

DETAILED DESCRIPTION

Figure 1A:
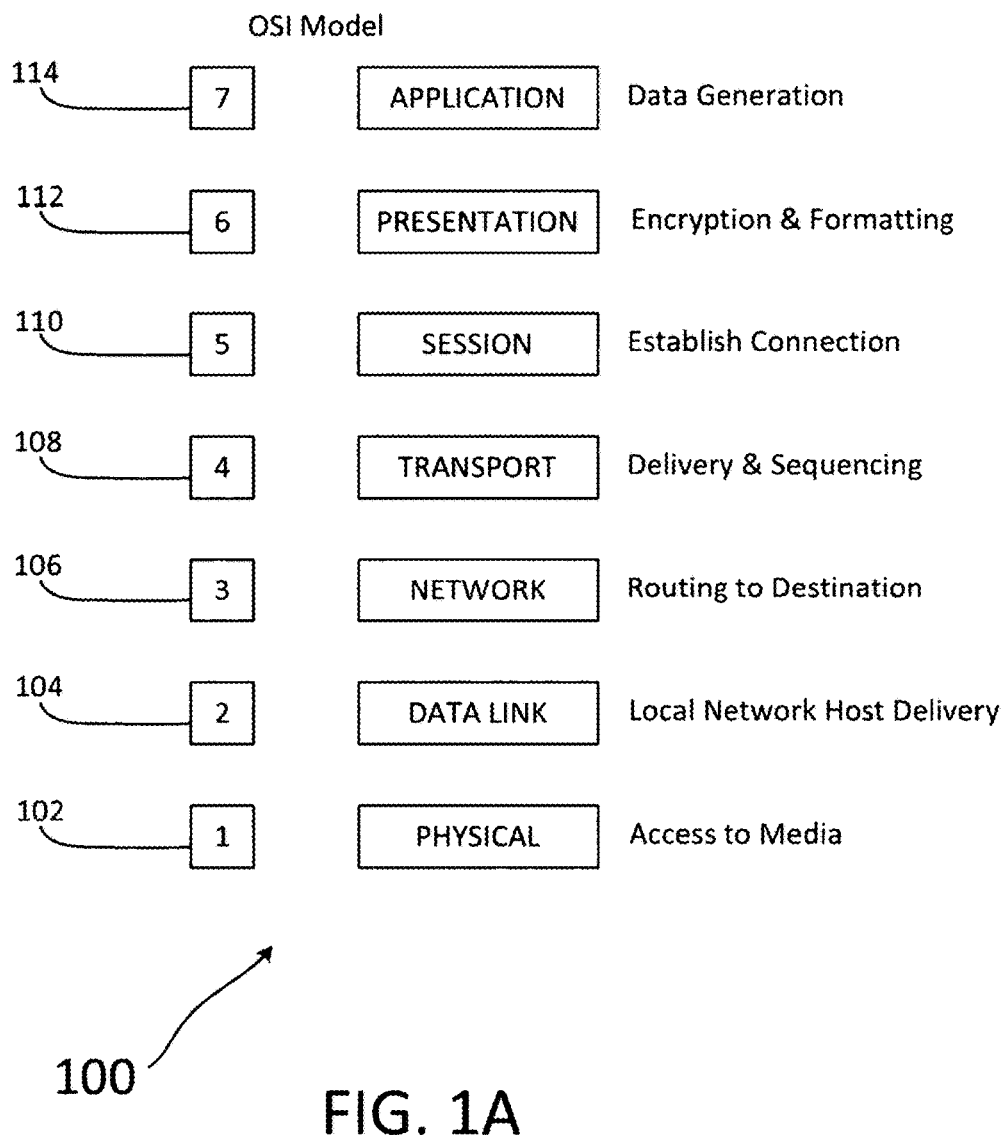
FIG. 1A illustrates a typical representation of the Open Systems Interconnect (OSI) model that characterizes and standardizes the communication functions of a telecommunication or computing system without regard to their underlying internal structure and technology.
Figure 1B:
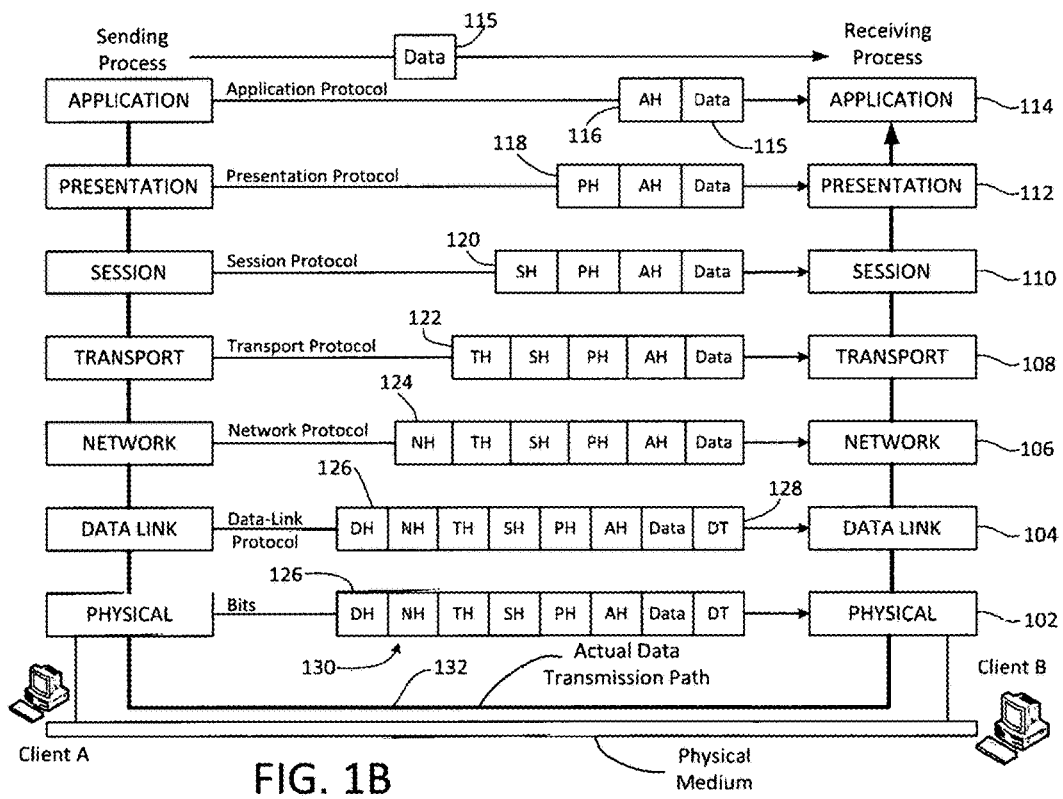
FIG. 1B illustrates a typical representation of data within messages using the OSI model of FIG. 1A.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of an internet based computer network. However, the embodiments to be discussed next are not limited to these systems but can be applied to other computer networks, such as local area networks (LANs), wide area networks (WANs), Global area networks (GANs), and wireless/cellular based networks, all of which include use of the open systems interconnection (OSI) model that characterizes and standardizes the communication functions of the telecommunication or computing system without regard to their underlying internal structure and technology.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics can be combined in any suitable manner in one or more embodiments.

According to aspects of the embodiments, the problems described above can be addressed by, for example, enforcing authentication in either or both of layers 3 and 4 of the OSI interconnection model, which are, respectively, the network and transport layers. Such authentication provides for broader applicability of access management access control. Authentication provided according to aspects of the embodiments substantially prevents malicious attackers from penetrating the computer network through compromised credentials, or by outright denial of the request either due to invalid credentials, or by virtue of a risk profile associated with the request. A risk profile can be generated by measuring information of the request that can include, but is not limited to, elements such as geographic location, a known device associated with the user, one or more responses from a trusted client source, and a threat analysis of the source internet protocol address (IP address). As known to those of skill in the art, a bad actor is a person/organization that intends to access the system through the guise of someone else, typically with valid credentials; however, a sufficiently designed risk profile can determine, through the above and other techniques, the likelihood that the user is not who they claim to be. In such scenarios, the system and method according to aspects of the embodiments can enact enforceable policies that dictate system behaviour in these instances. Such policies can include, by way of non-limiting example, denying access to the request application or service.

Figure 2:
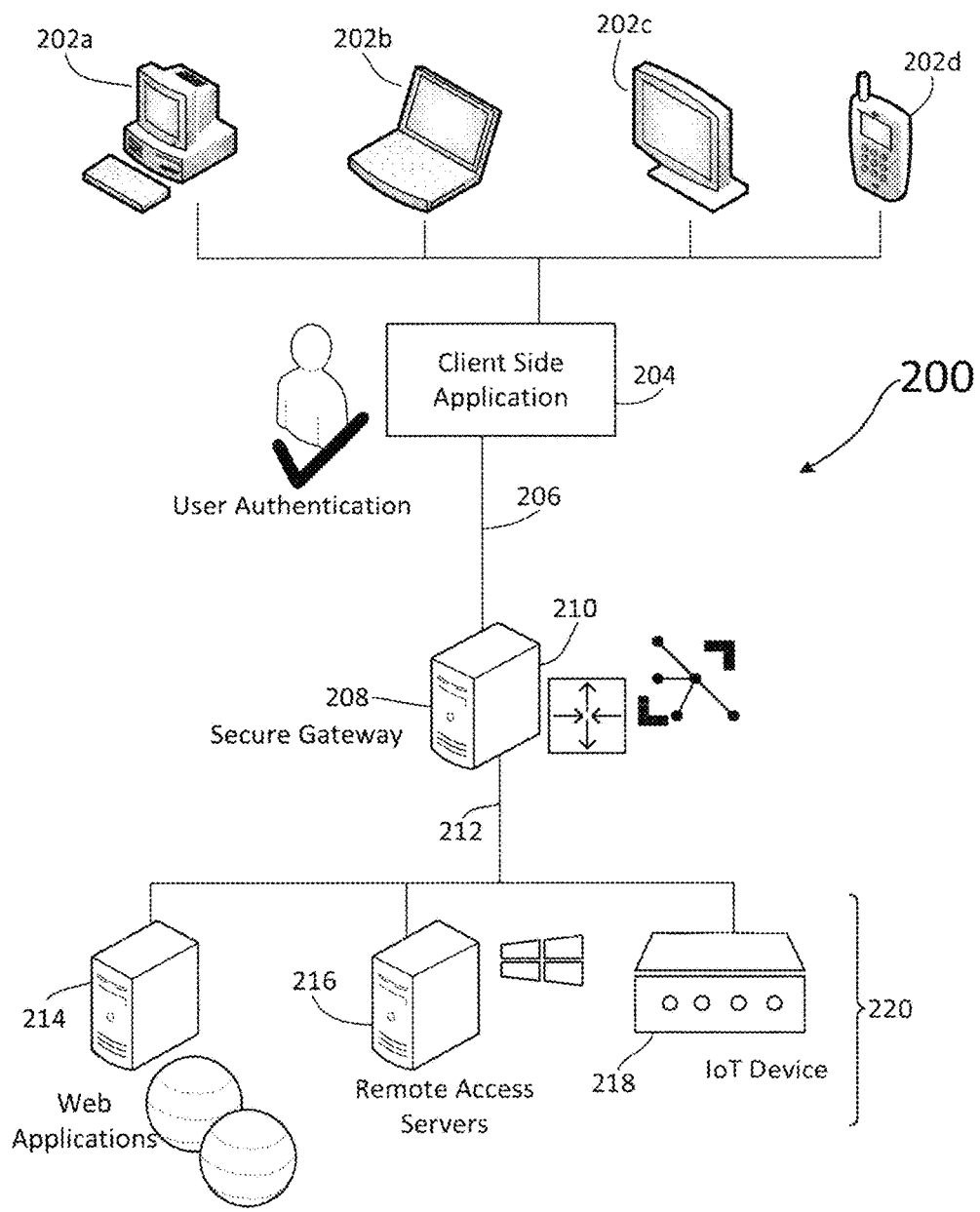
FIG. 2 illustrates a high level block diagram of a computer network depicting two devices that can communicate via a network interconnection and that authenticates identities using both network and transport layer protocols that provides secure access management control according to aspects of the embodiment.

Used throughout the specification are several acronyms, the meanings of which are provided as follows:
3G Third Generation
4G Fourth Generation
5G Fifth Generation
App Executable Software Programming Code/Application
ASIC Application Specific Integrated Circuit
BIOS Basic Input Output System
BT BlueTooth
CD Compact Disk
CRT Cathode Ray Tube
DVD Digital Video Disk
EEPROM Electrically Erasable Programmable Read Only Memory
FPGA Field Programmable Gate Array
GAN Global Area Network
GPS Global Positioning System
GSI Global Standard Initiative
GUI Graphical User Interface
GW Gateway
HDD Hard Disk Drive
HDMI High Definition Multimedia Interface
I/O Input/Output
IETF Internet Engineering Task Force
IoT Internet of Things
IP Internet Protocol
IPsec Internet Protocol Security
IR Infra-Red
ISP Internet Service Provider
L(n) Layer; n=1-7
LAN Local Area Network
LED Light Emitting Diode
LTE Long Term Evolution
Modem Modulator Demodulator
NFC Near Field Communications
NW Network
OSI Open System Interconnection
PAN Personal Area Network
PC Personal Computer
PDU Protocol Data Unit
PED Personal Electronic Device
POTS Plain Old Telephone Service
RAM Random Access Memory
RDP Remote Desktop Protocol
ROM Read-Only Memory
RW Read/Write
SSH Secure Shell Protocol
URL Uniform Resource Locator
USB Universal Serial Bus (USB) Port
UVPROM Ultra-Violet Programmable Read Only Memory
VGA Video Graphics Array
VPN Virtual Private Network
WAN Wide Area Network The following is a list of the elements of the Figures in numerical order:
100 OSI Model
102 First Layer Representation (Physical Layer L1)
104 Second Layer Representation (Data Link Layer L2)
106 Third Layer Representation (Network Layer L3)
108 Fourth Layer Representation (Transport Layer L4)
110 Fifth Layer Representation (Session Layer L5)
112 Sixth Layer Representation (Presentation Layer L6)
114 Seventh Layer Representation (Application Layer L7)
200 L3/L4 Authentication Gateway Network
202 User/Client Devices/Server (Client Side Server)
204 Client Side L3/L4 Authentication Application (Client Side Auth. App)
206 First Network
208 Secure L3/L4 Authentication Gateway Server (Gateway (GW) Side Server)
210 Gateway Side L3/L4 Authentication Application (GW Side Auth. App)
212 Second Network (similar/same/different as First NW)
214 L3/L4 Authentication Protected Web Based Applications (Auth. Protected App(s))
216 L3/L4 Authentication Protected Remotely Accessible Enterprise Server(s) (Auth. Protected Server)
218 L3/L4 Authentication Protected Internet of Things (IoT) Devices (Auth. Protected IoT Devices)
220 Authentication Protected Systems (Protected Systems)
300 Method for Open System Interconnection (OSI) Layer 3/Layer 4 (L3/L4) Authenticating Access to Protected Application(s) and/or Protected Device(s)
302-316 Steps of Method 300
400 Message Flow Diagram for token generation using application, network, and transport layer protocols of a communications system utilizing the OSI model
500 Message flow diagram for token consumption using application, network, and transport layer protocols of a communications system utilizing the OSI model
600 Message flow diagram rejecting an expired token using application, network, and transport layer protocols of a communications system utilizing the OSI model.
700 Message flow diagram rejecting authentication of a client using application, network, and transport layer protocols of a communications system utilizing the OSI model
801 Shell/Box
802 Integrated Display/Touch-Screen
804 Internal Data/Command Bus (Bus)
806 Processor Internal Memory
808 Processor(s)
810 Universal Serial Bus (USB) Port
811 Ethernet Port
812 Compact Disk (CD)/Digital Video Disk (DVD) Read/Write (RW) (CD/DVD/RW) Drive 814 Floppy Diskette Drive
816 Hard Disk Drive (HDD)
818 Read-Only Memory (ROM)
820 Random Access Memory (RAM)
822 RS 232, Ethernet, USB, Video Graphics Array (VGA), or High Definition Multimedia Interface (HDMI) Port
823 External Display Cable
824 External Memory Storage Device
826 External Display/Touch-Screen
828 Keyboard
830 Mouse
832 Processor Board Memory
834 Flash Drive Memory
836 CD/DVD Diskettes
838 Floppy Diskettes
840 Executable Software Programming Code/Application (Application, or "App")
842 Wi-Fi Transceiver
844 BlueTooth (BT) Transceiver
846 Near Field Communications (NFC) Transceiver
848 Third Generation (3G), Fourth Generation (4G), Fifth Generation (5G), Long Term Evolution (LTE) (3G/4G/5G/LTE) Transceiver
850 Communications Satellite/Global Positioning System (Satellite) Transceiver
852 Antenna
854 Internet
856 Universal Serial Bus (USB) Cable
858 Ethernet Cable (CATS)
860 Scanner/Printer/Fax Machine
902 Mobile Device
906 Internet Service Provider (ISP)
908 Modulator/Demodulator (Modem)
910 Wireless Router
912. Plain Old Telephone Service (POTS) Provider
914 Cellular Service Provider
918 Communication Satellites
920 Cellular Telecommunications Service Tower (Cell Tower)
922 Internet
924 Global Positioning System (GPS) Station
926 Satellite Communication Systems Control Station
928 Global Positioning System (GPS) Satellite
930 Server
1000 Conventional OSI Network Connection Establishment Message Application Layer L7 Swim-Lane Diagram
1002 L7 Connection Request Protocol Data Unit (PDU) Message
1004 L7 Connection Confirmation Protocol Data Unit (PDU) Message
1100 OSI Network Connection Establishment Message Network/Transport Layer L3/L4 Swim-Lane Diagram
1102 L3/L4 Connection request PDU message
1104 L3/L4 Authentication Call to Client Based on 1102 Connection Request PDU Message
1106 L3/L4 Completion of User Authentication PDU Message
1108 L7 Connection Request Completion PDU Message
1110 L7 Connection Confirmation PDU Message FIG. 2 illustrates a high level block diagram of OSI model layer 3/layer 4 (OSI L3/L4) authentication access gateway network (network) 200 according to aspects of the embodiment, in which at least two devices can communicate via a network interconnection and which authenticates identities using either or both of network and transport layer protocols to secure broader applicability to access management control according to aspects of the embodiment.

Network 200, according to aspects of the embodiments, comprises one or more client side devices/servers (client side servers) 202a-d, client side L3/L4 authentication (auth.) application (App) (client side auth. App) 204 (which resides in the one or more of client side server 202a-d), first network 206 that uses OSI model 100 for communications, one or more secure L3/L4 authentication gateway (GW) side servers (GW side server) 208, each of which includes gateway side L3/L4 auth. App (GW side auth. App) 210, gateway side second network (second network) 212, and one or more L3/L4 authentication protected applications (protected Apps) 212, L3/L4 authentication protected remote access devices (protected devices) 216, and L3/L4 authentication protected IoT devices (protected IoT devices) 218 (hereinafter collectively referred to as "protected systems 220" according to aspects of the embodiments). Client side servers 202 can include client side software consisting one or more of a service, application (App), browser plug-in, or browser extension, among other software client types.

As those of skill in the art can appreciate, the term "IoT" refers to a separate network of physical devices, vehicles, buildings and other objects, each of which is embedded with electronics, software, sensors, actuators, and network connectivity that enable these objects to collect and exchange data. In 2013 the Global Standards Initiative on Internet of Things (IoT-GSI) defined the IoT as "the infrastructure of the information society." The IoT allows objects to be sensed and controlled remotely across existing network infrastructure, creating opportunities for more direct integration of the physical world into computer-based systems, and resulting in improved efficiency, accuracy, and economic benefit. When the IoT is augmented with sensors and actuators, the technology becomes an instance of the more general class of cyber-physical systems, which also encompasses technologies such as smart grids, smart homes, intelligent transportation, and smart cities, among other technologies Client side auth. App 204 and GW side auth. App 210 are designed to work together to provide the L3/L4 authentication access that will overcome or obviate the problems with using URL or L7 114 security devices. As described in greater detail below, client side auth. App 204 is designed to retain tokens for the one or more users of a given device.

Once installed on secured GW side server 208, GW side auth. App 210 need only be provided with an appropriately configured list of corresponding usernames, passwords, and tokens. As those of skill in the art can appreciate, first network 206 and second network 212 can include the Internet and any other type of network that uses OSI model 100 communications. Such networks can include those organized or set-up as a personal area network (PAN), LAN, WAN, or GAN, and can further include wired or wireless networks, the latter including those such as an 802.11xx Wi-Fi LAN, BlueTooth, ZigBee, mesh network, near field communications (NFC) network, third generation (3G), fourth generation (4G) fifth generation (5G) long-term evolution (LTE) cellular networks, among others, including infra-red (IR) wireless networks. First network 206 and second network 212 can be the same type of network, or they can be different. In addition, second network 212 need not be a network at all in the conventional sense, but can comprise simple wired (copper cable, coaxial, and/or fiber-optic) connections of devices. In fulfillment of the dual purposes of clarity and brevity, all of elements 214, 216, 218, can be referred to as authentication protected systems (protected systems) 220.

Figure 3:
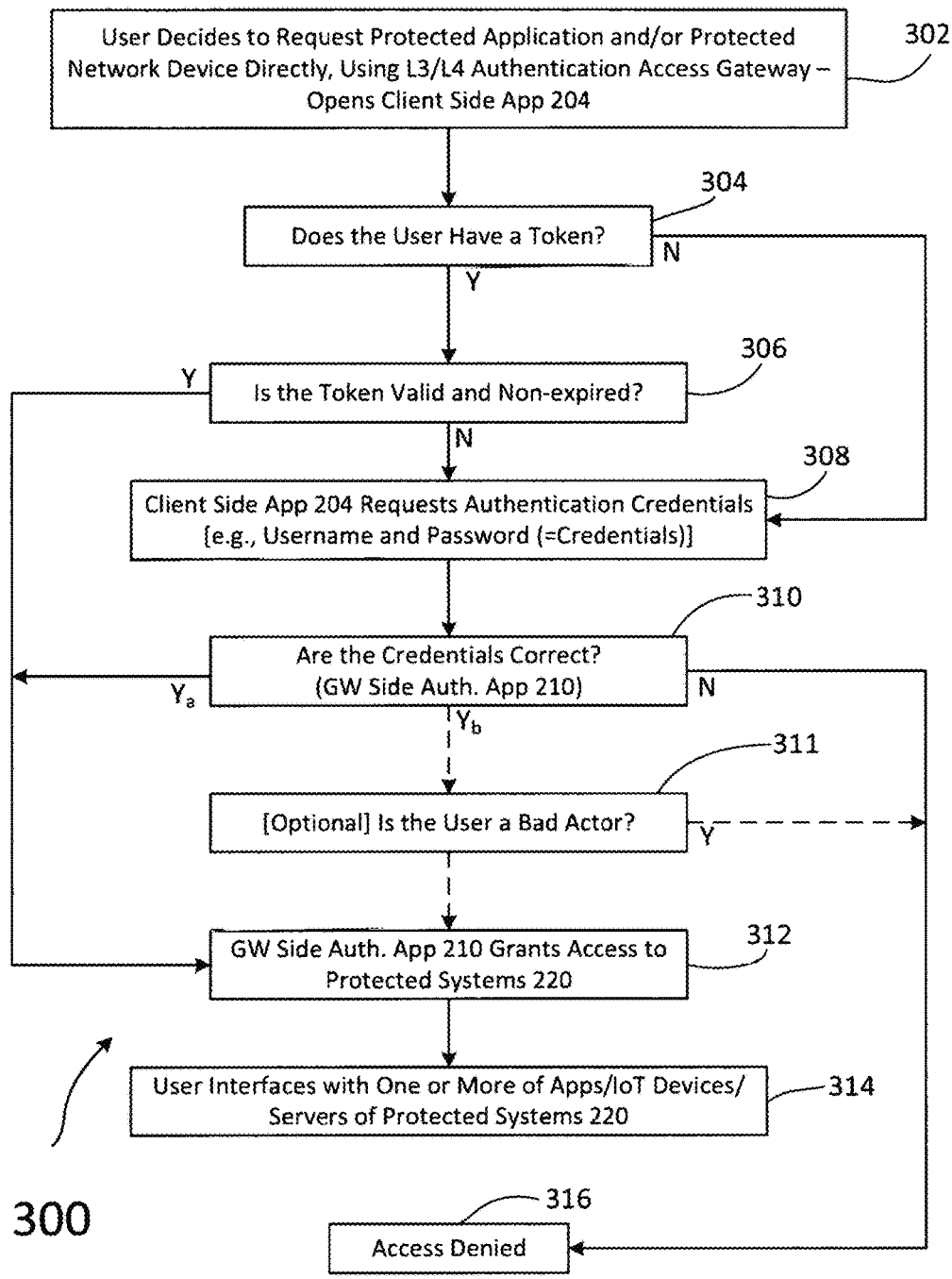
FIG. 3 illustrates a flow diagram of a method for authenticating identities using both network and transport layer protocols according to aspect of the embodiments.

FIG. 3 illustrates a flow diagram of method 300 for authenticating identities using both network and transport layer protocols according to aspect of the embodiments.

Method 300 begins with step 302 in which a user of network 200 either decides to request access to one or more protected applications or devices 214, 216, 218 (collectively referred to herein after as "protected systems 220"), or attempts to open or access one of the protected systems 220 (a "link" to which can exist as an icon on a desktop graphical user interface (GUI), or saved webpage, among other means for accessing remotely located protected systems 220). Regardless of which approach the user employs, according to aspects of the embodiments, the user uses the systems and methods according to aspects of the embodiments that employ authentication and other processes using network and transport layers L3/L4 106, 108 protocols of the OSI model, as embodied in software and applications (client side auth. App 204 and GW side auth. App 210), and hardware in one or more of client side servers 202a-d (reference being made, for the sake of clarity and brevity, to only a single client side server 202), GW side server 208, and protected systems 220.

According to aspects of the embodiments, when a user attempts to open an App or other item of protected systems 220, an application protocol request will be initialized. As those of skill in the art can appreciate, such application protocol requests approximate a client-gateway-server (with the protected systems 220) setup. The opening of the application protocol request generates a call to GW side server 208 instead of the server(s) that contain the protected information/systems/devices (protected systems 220), because that provides the beginning of the process for establishing authentication (e.g., as described in method 300). GW side server 208 (using GW side auth. App 210) then issues a call back to client side server 202, calling out client side auth. App 204. Then, client side auth. App 204 opens, and method 300 proceeds as if the user has opening client side auth. App 204 initially.

In fulfillment of the dual purposes of clarity and brevity, however, the remaining discussion of method 300 shall proceed using the case of the user opening a network enabled application on client side server 202. In method step 302, the user opens a network enabled application on client side server 202. Note that in this step, the activity occurs in application layer L7 114 (which can be but not limited to a uniform resource locator (URL)). Network traffic is routed through the GW side server 208, and GW side auth. App 210. GW side server 208 and GW side auth. App 210 holds the request from the network enabled application and sends an authentication request to the client side auth. App 204 (which resides in one or more of the client side servers 202).

Client side auth. App 204 can be embodied with a graphical user interface (GUI) that includes a portion that requests the user to authenticate and upon successful authentication the client software receives an access or identity token commonly used in federation protocols. As those of skill in the art can appreciate, with use of the embodiments described herein, tokens can have a limited lifespan, and be single use only. According to further aspects of the embodiments, however, tokens can also be repetitively used and have an infinite lifespan. According to still further aspects of the embodiments, tokens can have a limited number of uses and a limited lifespan, or any combination of number of uses, lifespan, and termination date. For the purposes of this discussion, however, the tokens being used by the user have limited lifespans. As those of skill in the art can appreciate, there are frameworks available that can be used for token implementation. For example, OAuth 2 is an authorization framework that enables applications to limited access to user accounts; it does this by delegating user authentication to the service that hosts the user account, and authorizing third part application to access the user account. Thus, OAuth 2 provides authorization flows for web and desktop applications, among other devices. In addition to OAuth 2, aspects of the embodiments further include the use of Open ID Connect. Open ID Connect, as those of skill in the art can appreciate, is an identity framework that is built on top of OAuth 2 that extends the authorization process to implement its authentication mechanism. Among other features, Open ID Connect adds a discover process that enables users to use whichever identity provider they want with any website that supports Open ID Connect. That is, Open ID Connect provides to users support capability to single sign on (SSO) capabilities to substantially any website and substantially any website provider. In fulfillment of the dual purposes of clarity and brevity, a greater detailed discussion of either or both OAuth 2 and Open ID Connect will not be provided, as such discussion is not necessary to understand the aspects of the embodiments as described herein.

A token, as described above, is a physical thing—in this case, a data file. Or, as those of skill in the art can appreciate, a small consumable, electronic data file. One example of such token is the Jason Web Token (JWT). See, by way of non-limiting example, https://jwt.io/introduction/ for a full discussion of JWTs. In fulfillment of the dual purposes of clarity and brevity, however, a brief description is all that need be provided to aid in understanding the aspects of the embodiments. A JWT, as other tokens purport to do, is a physical manifestation of an open standard (e.g., RFC 7519) that defines a compact and self-contained manner for securely transmitting information between parties as a Jason object. JWTs use digital signature to provide trust and verification. Such signatures can include a secret key (such as a keyed hash message authentication code (HMAC) algorithm) or a public/private key using RSA. An HMAC is a specific type of message authentication code (MAC) involving a cryptographic hash function in combination with a secret cryptographic key. As with any MAC, it may be used to simultaneously verify both the data integrity and the authentication of a message. Use of such algorithms and authentication codes are known to those of skill in the art. The term "RSA" refers to encryption products produced by the company "RSA Security LLC." Such encryption products, very broadly defined, use public and private keys, the latter being generated by the factorization of two large prime numbers. As those of skill in the art can appreciate, such description is very general. More information can be obtained by referring to https://www.rsa.com/en-us.

The JWT encompasses three main parts: A header, payload, and signature. The header includes information pertaining to the type of token (JWT) and the hashing algorithm. The payload contains the "claims." A token "claim" is a statement (or definition) of the entity using or administering the JWT, and additional metadata. Claims can be public, private, and reserved. More detailed information about the definition of claims is not needed to appreciate the aspects of the embodiments, and can be obtained by reference to the above-provided webpage. The signature component of the JWT is based on the encoded header and payload. The JWT data file is then put together as three Base64 strings separated by dots.

In usage (by way of non-limiting example, a JWT), aspects of the embodiments can employ OAuth 2 as a means for using that token; that is, in all or some of client side server 202, and client side auth. App 204, and GW side server 208, GW side auth. App 210 there exists additional code, software and/or applications are implemented that provide the functionality for OAuth 2 to use the JWT. In practical terms, this means a series of exchanges of messages using layer L7 for transmittal of the token, which generally occurs using the hypertext transmit protocol secure (HTTPS) protocol. In addition, according to further aspects of the embodiments, the JWT (or some other similar token) can be used by OpenID Connect (see, e.g., http://openid.net/connect/). Similarly to OAuth 2, OpenID Connect provides a means for the use of the token to provide authentication, through the exchanges of messages between the two servers, client side server 202, and GW side server 208.

In decision step 304, client side auth. app 204 determines whether the user is authenticated; that is, does the user have a security token? A security token, e.g., such as a JWT, can be generated by GW side auth. App 210 after successful authentication by the user. The security token is then handed to the client and stored on client side server 202 for future requests by client side auth. App 204 to GW for access. According to aspects of the embodiments, there can be three states that a client can be in regard to tokens: (a) without a token; (b) with an expired token; and (c) with a non-expired token. As described below in regard to the discussion of method 300, GW side auth. App 210 can treat each of these three states in the following ways. If the client is without token, GW side auth. App 210 can send a request to client side auth. App 204 in client side server 202 for authentication. If the client has a non-expired token, GW side auth. App 210 does not prompt for authentication, instead passing the user on through to the protected system. If, however, the client has an expired token, GW side auth. App 210 can send a request to client side auth. App 204 for authentication. In the client states where either no token exists, or the client has an expired token, the user is prompted for authentication information, and upon successful completion, a new token is generated by GW side auth. App 210 and is provided to the client (e.g., client side auth. App 204).

If the user has a token ("Yes" path from decision step 304), the user input that token into client side auth. App 204, in, for example, a GUI window that can open just for this purpose. Method 300 the proceeds to decision step 306. In decision step 306, client side auth. App 204 and method 300 determines whether the token is valid (or non-expired). If the token is valid (note that an invalid token generally indicates a "bad actor" or someone trying to "spoof" the system) and non-expired (an expired token is one in which the sessions has expired, and the user needs to authenticate again; "Yes" path from decision step 306), method 300 proceeds to step 312. In method step 312, GW side auth. App 210 grants access to protected systems 220, and in method step 314, the user accesses one or more of Apps, IoT Devices, and servers of protected systems 220.

Figure 5:
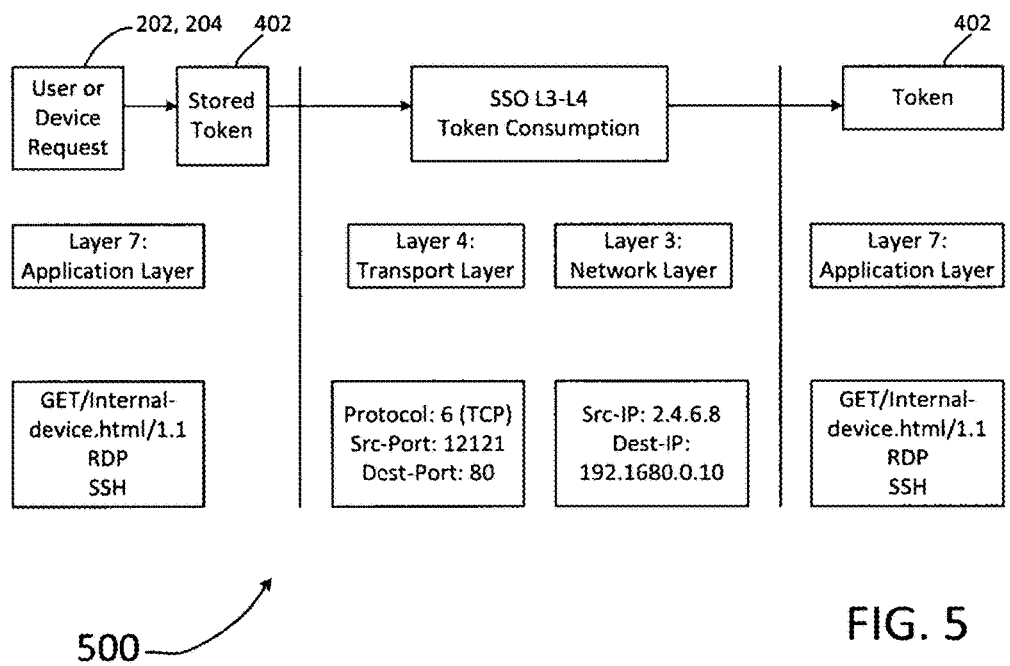
FIG. 5 illustrates a message flow diagram for token consumption using application, network, and transport layer protocols of a communications system utilizing the OSI model according to aspects of the embodiments.
Figure 10:
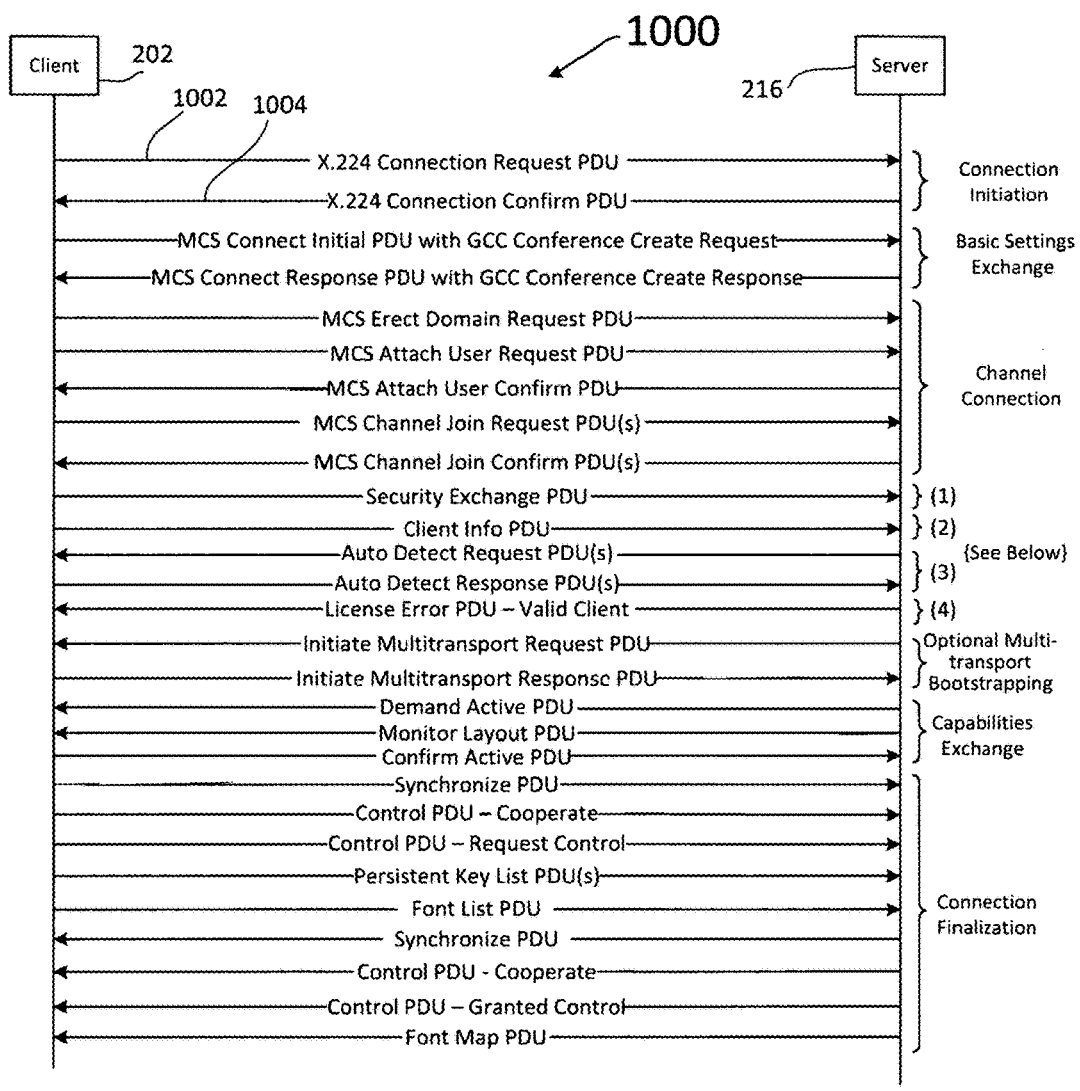
FIG. 10 illustrates a conventional swim-lane diagram in an OSI network in which network communications are established.
Figure 11:
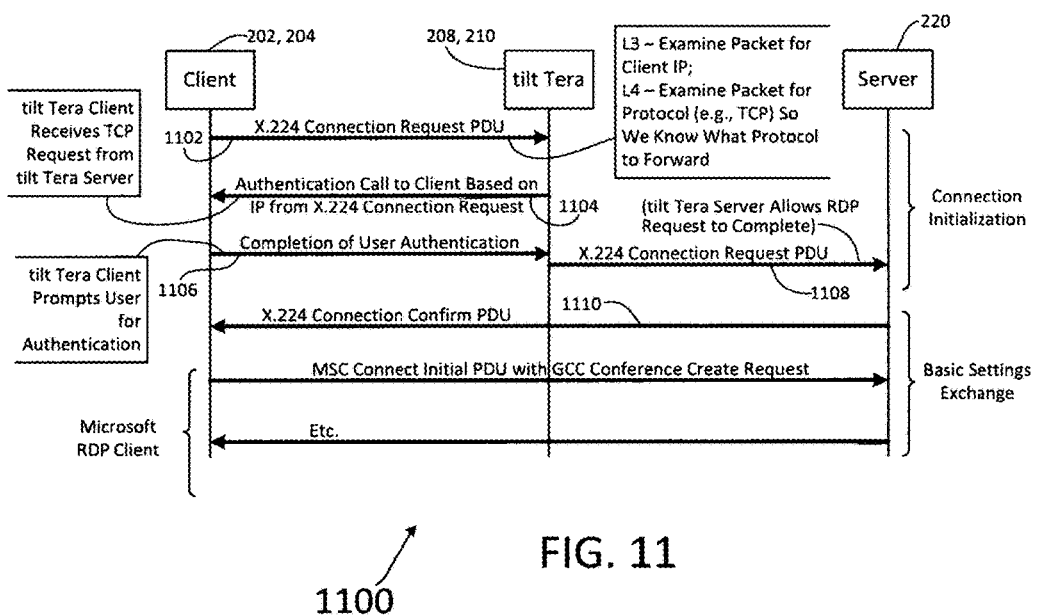
FIG. 11 illustrates a portion of a swim-lane diagram in an OSI network in which network and transport layer authentications occur and then network communications are established according to aspects of the embodiments.

Attention is now directed to FIGS. 5, 10, and 11. FIG. 5 illustrates message flow diagram 500 for token consumption using application, network, and transport layer protocols of a communications system utilizing the OSI model according to aspects of the embodiments, FIG. 10 illustrates conventional swim-lane diagram 1000 in an OSI network in which network communications are established, and FIG. 11 illustrates a portion of swim-lane diagram 1100 in an OSI network in which network and transport layer authentications occur and then network communications are established according to aspects of the embodiments.

Figure 4:
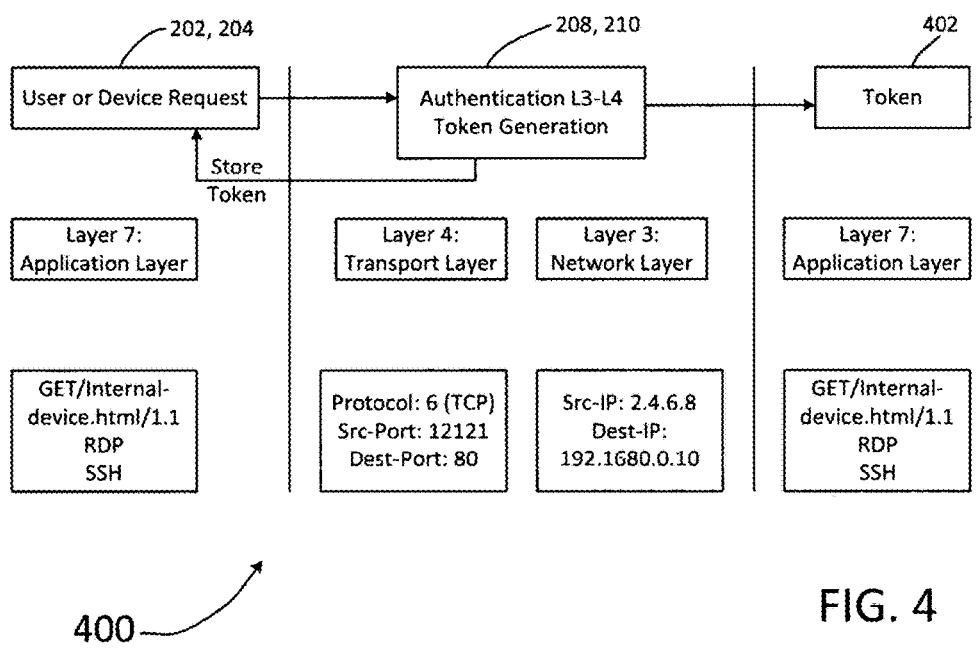
FIG. 4 illustrates a message flow diagram for token generation using application, network, and transport layer protocols of a communications system utilizing the OSI model according to aspects of the embodiments.

Prior to turning to FIG. 4, attention is directed to FIGS. 10 and 11. FIG. 10 illustrates conventional OSI network connection establishment message swim-lane diagram 1000. As can be seen in FIG. 10, connection request protocol data unit (PDU) message 1002 can be sent from client side server 202 to server 216; as described above, most conventional systems allow access to servers through application layer L7 114 transmissions. Presuming that the requested can be honoured, then server 216, in connection confirmation PDU 1004, replies to client side server 202; in this manner, a basic network communications connection is initiated.

Attention is now directed to FIG. 5, which is an authentication verification and token generation message flow diagram using both network layer L3 106 and transport layer L4 108, and FIG. 11, which illustrates a portion of swim-lane diagram 1100 in an OSI network in which authentication (and, in this case, token generation) occurs using both of network layer L3 106 and transport layer L4 108 according to aspects of the embodiments. According to further aspects of the embodiments, FIGS. 5 and 11 show interaction between the user and client side auth. App 204 that occurs in the application layer (L7 114) in client side server 202, but wherein the token consumption messages are transmitted and received between client side auth. App 204 and GW side auth. App 210 using both network layer L3 106 and transport layer L4 108.

As discussed above, it was established in method step 304 that the user has a token, and in decision step 306, that the token was both valid and unexpired. However, in order to gain access to protected systems 220, client side auth. App 204 and GW side auth. App 210 work together using both network and transport layers L3/L4 106/108 protocols to transfer the token to GW side auth. App 210 in GW side server 208 to "consume" the token.

When the user enters the token information, client side auth. App 204, in method step 306, generates connection request PDU message 1102 in both L3 106 and L4 108. In response to the network layer L3 106 portion of connection request 1102, GW side auth. App 210 (in GW side server 208), in method step 310, examines the L3 portion for client internet protocol (IP) information; such IP information in network layer L3 106 can include, for example, a source IP address of 2.4.6 8 and a destination IP address of 192.168.0.10. In addition, GW side auth. App 210 examines the L4 portion for protocol information, so that the GW side auth. App knows what kind of protocol to forward to one or more the protected devices 220. For example, as shown in FIG. 5, the protocol can be 6 (TCP) with a source port address of 12121, and a destination port address of 80. GW side auth. App 210 (in method step 310) returns an authentication call to client based on IP from the connection request message 1104 to client side auth. App 204 using both the L3 and L4 106/108 layers. Client side auth. App 204 receives the TCP request. Client side auth. App 204 then prompts the user for credential information and forwards the same to GW side auth. App 210, again using L3/L4 layers 106, 108 in completion of user authentication message 1106. GW side auth. App 210 receives message 1106, and forwards the connection request PDU message 1108 to one or more of the protected systems 220. The targeted device of protected systems 220 returns connection confirmation PDU message 1108 to client side auth. App 204, and the connection is thereby established. From thereafter, basic settings exchanges messages can take place, among other message types, and the user then eventually has access to one or more of the devices of protected systems 220 according to aspects of the embodiments.

Regardless of the type of messages that are exchanged between client side auth. App 204 and GW side auth. App 210, the basic flow and use of L3/L4 layers 106 and 108 are substantially the same according to aspects of the embodiments, as FIGS. 4-7 illustrate. According to aspects of the embodiments, by removing the authentication process from application layer L7 114 to network and transport levels L3/L4 106, 108, the overall security of transmission/reception is increased for at least the following reasons. As those of skill in the art can appreciate, existing authentication takes place directly at the application in the application layer (e.g., layer 7 114). A nefarious user today looks no different than a normal user when they have compromised credentials. Computer network systems cannot inherently trust or assume in any way the user is who they say they are. Enforcing validation or verification of the validity of the user before those credentials can be provided to the application is key and critical in the foundation of establishing creditability and trust with the proclaimed end user. Therefore, a multi-tier approach according to aspects of the embodiments is provided herein. According to aspects of the embodiments, establishing credibility and trust (the verification process), begins with client validation. If a valid client is not found (e.g., no token), the connection is terminated immediately and no access is provided, thus enabling greater security. Secondly, a risk profile can be created in which "allow" or "deny" policies can be defined prior to the process of authentication or even access to the protected system. According to further aspects of the embodiments, techniques can be implemented that provide for passwordless authentication; use of hacked or stolen passwords are common "attack vectors" that nefarious entities currently use to gain a foothold into an organization. Finally, according to further aspects of the embodiments, as the capture of credentials takes place outside of the protected application, various attack vectors are eliminated such as brute force, dictionary, and key-logger attacks. Combined together, the synergistic effects of such a multi-layered security apparatus reduce the overall likelihood or probability of a successful attack.

According to further aspects of the embodiments, the interface between the user and client side auth. App 204 occurs in application layer L7 114, using any one of a number of protocols, including HTTP, HTTPS, the use of which depends on the particular application (e.g., GET/internal-device.html/1.1; remote desktop protocol (RDP); and secure shell protocol (SSH), among others, according to aspect of the embodiments.

Returning to decision step 304, if the user does not have a token ("No" path from decision step 304), method 300 (and client side auth. App 204) proceeds to method step 308. In step 308 ("No" path from decision step 304), client side auth. App 204 requests the user to enter their authentication information. As in regard to the token information, a new sub-window can open in the GUI, and the user can enter their credential information. Then, in decision step 310, method 300 and client side auth. App 204 and GW side auth. App 210 determines whether the authentication information is correct, through the use of L3/L4 106/107 message communications, as illustrated in FIG. 4, and FIG. 11.

In method step 310 of method 300, a new window will open in the GUI of client side auth. App 204, and the user will enter their credentials, requesting a new token. Credentials, as those of skill in the art can appreciate, can include one or more of a username, password, answers to one or more security questions, biometrics, geographical location (e.g., based on global positioning system information, cellular based position determinations, and internet service provider (ISP) positioning determinations based on the IP address of the user's computer, among other systems), and the like. For example, credentials can further include a random number generator fob that is synced with GW side auth. App 210; that is, the random number generator fob generates a random number that matches a random number being generated at GW side server 208 in a manner known to those of skill in the art. Client side auth. App 204 interfaces with the user in L7 114 or the APPLICATION layer, but then passes the credential information to GW side auth. App 210 using a L3/L4 106/108 message; this is shown in message/data flow diagram FIG. 4, and method step 310.

Attention is now directed to FIG. 4, which illustrates authentication verification and token generation message flow diagram 400 using both network layer L3 106 and transport layer L4 108, and FIG. 11, which illustrates a portion of swim-lane diagram 1100 in an OSI network in which authentication (and, in this case, token generation) occurs using both of network layer L3 106 and transport layer L4 108 according to aspects of the embodiments. According to further aspects of the embodiments, FIGS. 4 and 11 show interaction between the user and client side auth. App 204 that occurs in the application layer (L7 114) in client side server 202, but wherein the authentication and token generation messages are transmitted and received between client side auth. App 204 and GW side auth. App 210 using both network layer L3 106 and transport layer L4 108.

Client side auth. App 204 prompts the user for credential information and forwards the same to GW side auth. App 210, using network and application L3/L4 layers 106, 108 in completion of user authentication message 1106. GW side auth. App 210 receives message 1106, and forwards the connection request PDU message 1108 to one or more of the protected systems 220. The targeted device of protected systems 220 returns connection confirmation PDU message 1108 to client side auth. App 204, and the connection is thereby established. From thereafter, basic settings exchanges messages can take place, among According to further aspects of the embodiments, the interface between the user and client side auth. App 204 occurs in L7 114, using a GET/internal-device.html/1.1 message protocol, which can be either of an RDP or a secure shell protocol (SSH), among others, according to aspect of the embodiments.

According to aspects of the embodiments, the user interfaces with client side auth. App 204 in application layer L7 114 and GW side auth. App 210 in layers L3/L4 106/108, and can access the generated token (FIG. 4), use a previously obtained token (FIG. 5), determine that a token has expired (FIG. 6, which illustrates message flow diagram 600 rejecting an expired token using application, network, and transport layer protocols of a communications system utilizing the OSI model according to aspects of the embodiments), or determine that authentication has failed (FIG. 7, which illustrates message flow diagram 700 rejecting authentication of a client using application, network, and transport layer protocols of a communications system utilizing the OSI model according to aspects of the embodiments), in application layer L7 114 according to aspects of the embodiments. Thus, in fulfillment of the dual purposes of clarity and brevity, the above description of how L3/L4 messages are generated and exchanged as described in reference to FIG. 11 need not be repeated in such detail in regard to the steps of method 300 in the ensuing discussion.

Following determination of the credentials as being correct, method 300, client side auth. App 204, and GW side auth. App 210 grant access in method step 312 to protected systems 220, and in method step 314, the user can access one or more of Apps, IoT devices, and servers of protected systems 220.

Attention is again directed to FIG. 3, and method 300: If the credentials entered by the user are not correct ("No" path from decision step 310), method 300 proceeds to step 316 and denies access to the user of any of the Apps, servers, and IoT devices that comprise protected systems 220. Then, the message flow diagram of FIG. 7 comes into play.

If, however, as described above, the credentials are correct, and a token can be generated (and subsequently consumed; "Yes" path from decision step 310), then method 300 can choose from one of two "Yes" paths. The first is optional "Yes" path $Y_a$. In this path, method 300 and GW side auth. App 210 grants access to the user to one or more of Apps, servers, and IoT devices that comprise protected systems 220, in method steps 312 and 314.

The second optional path from decision step 310 is "Yes" path $Y_b$, in which method 300 attempts to ascertain whether the user is a "bad actor." A bad actor can be someone who has the correct credentials, or at least access to the correct credentials, but is not who they portray themselves to be. According to aspects of the embodiments, method 300 can ascertain "bad actors" through use of biometrics, additional security questions, or combinations thereof. If it is determined that the user is a bad action ("Yes" path from decision step 311), the method 300 denies access to protected systems 220 in step 316. If GW side auth. App 210 and method 300, through use of network and transport layers L3/L4 106/108 communications determines that the user is not a bad actor ("No" path from decision step 311), then access is granted to protected systems 220 by GW side auth. App 210 in method step 312, and method steps 314, 316 occur, through both of client side auth. App 204 and GW side auth. App 210, and network and transport layers L3/L4 106/108 communication messages, in the manner described above according to aspects of the embodiments, to give the user access to protected systems 220.

The primary action that can occur if the credentials are correct as determined in decision step 310 is that access is granted to the user to protected systems 220 in network 200 through GW side auth. App 210. The appropriate VPN is then set up, using one or many different mechanisms as known to those of skill in the art, and in method step 316 the user interfaces with one or more of devices, applications, IoT devices, among other systems of protected systems 220.

Figure 6:
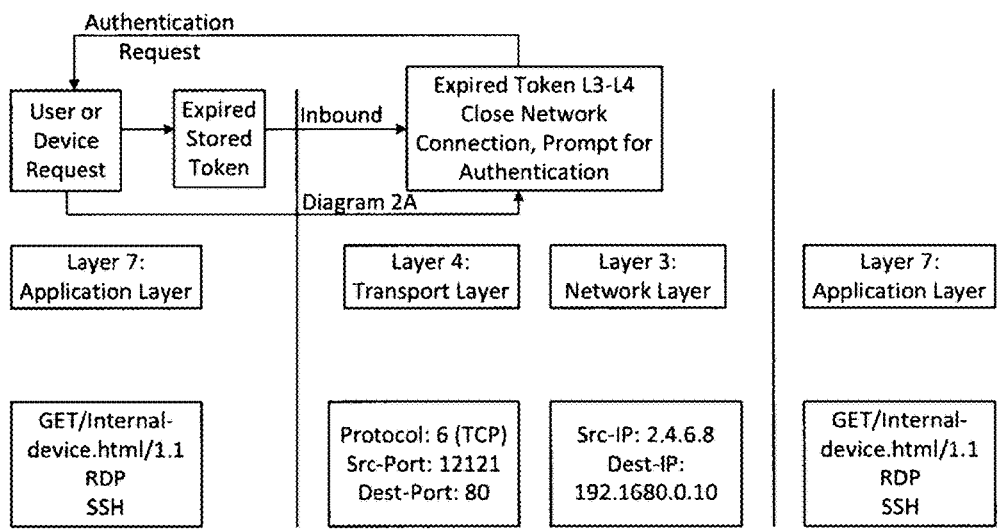
FIG. 6 illustrates a message flow diagram rejecting an expired token using application, network, and transport layer protocols of a communications system utilizing the OSI model according to aspects of the embodiments.

Referring back to decision step 304, if it is determined that the user has a token ("Yes" path from decision step 304), method 300 proceeds to decision step 306. In decision step 306, method 300, e.g., client side auth. App 204, determines whether the token is invalid for any of a number of reasons. An example of a message flow diagram that occurs when method 300 executes these steps is shown in FIGS. 5 and 6.

In the determination of whether the user has a valid token ("Yes" path from decision step 306), client side auth. App 204 requests the user to input the token, and enter their credentials; this activity occurs in URL L7 114 as shown in FIG. 5. The stored token is then transported from client side auth. App 204 to GW side auth. App 210 using either or both of network layer L3 106 and transport layer L4 108 according to aspects of the embodiments. Use of layers L3 106 and/or L4 108 provides enhanced security for the reasons described above. When received at GW side auth. App 210, the token and credentials are checked and verified again, and the token is "consumed." A token-consumed message is transmitted back to client side auth. App 204 from GW side auth. App 210, again using L3/L4 106/108 messages, as shown in FIG. 5.

Following receipt of the "token consumed" message from GW side auth. App 210, client side auth. App 204 and method 300 directs the user ("Yes" path from decision step 306) to method step 314 wherein GW side auth. App 210 grants access to protected systems 220, and in method step 316, the user can access one or more of protected systems 220.

Figure 7:
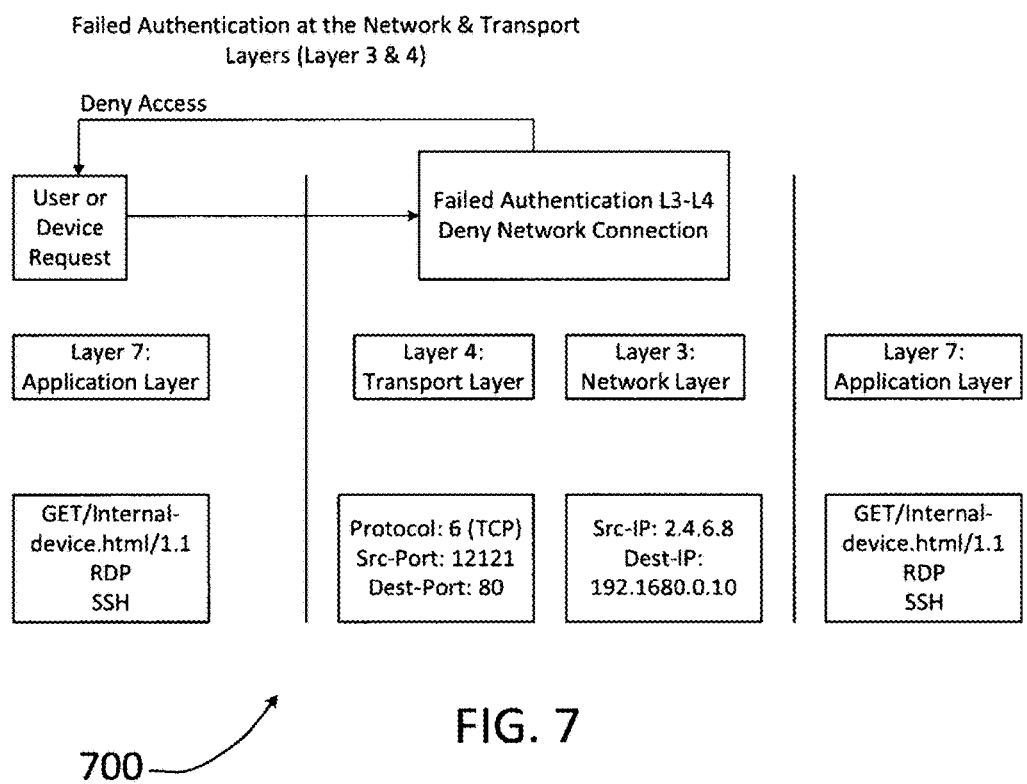
FIG. 7 illustrates a message flow diagram rejecting authentication of a client using application, network, and transport layer protocols of a communications system utilizing the OSI model according to aspects of the embodiments.

If, however, the user has an invalid or expired token ("No" path from decision step 306), method 300 and client side auth. App 204 proceeds to method step 308 wherein the GUI of client side auth. App 204 opens a new window and requests the credentials of the user. Message flow diagrams 600 and 700, of FIGS. 6 and 7, respectively, illustrates the message flows that occur when an expired token (FIG. 6) or invalid token (FIG. 7) is presented in decision step 306 according to aspects of the embodiments. In either case, method 300, and client side auth. App 204 interfaces with the user in application layer L7 114, and client side auth. App 204 and GW side auth. App 210 transmits and receives messages in network layer L3 106 and transport layer L4 108, in the manner as described above (see, discussion of FIG. 11, above), to convey the information that the token is either or both of invalid and expired. If the authentication credentials are not good ("No" path from decision step 310), method 300 proceeds to step 312 and denies access, as FIGS. 6 and 7 illustrate. If, however, the credentials are good, method 300 can again take one of two paths, as discussed above: optional "Yes" path $Y_b$, wherein method 300 determines whether there is a "bad actor," or the more typically used "Yes" path $Y_a$, wherein method 300 proceeds to method step 314, and grants access. Then, in method step 316, the user can interface with one or more of protected systems 220.

Thus, as has been described in regard to FIGS. 2-7 are systems, modes, and method for increasing security in regard to accessing of protected systems such as IoT devices 218, servers 216, and applications 214. Such enhanced and increased security is achieved through use of the network and transport layer protocols L3, L4 106, 108. Such security cannot be achieved through the use of much more commonly used application layer L7 114 protocols for at least the reasons of establishing creditability and trust with the proclaimed end user; eliminating pass-the-hash issues (see, e.g., http://www.windowsecurity.com/articles-tutorials/misc_network_security/Dissecting-Pass-Hash-Attack.html), brute force and other styles of password based attacks; and denying access outright without the opportunity to present credentials based on risk. According to aspects of the embodiments, before any user is allowed any access of the requested protected systems 220, the systems, methods, and modes of the aspects of the embodiments create additional security layers above and beyond existing application layer L7 114 techniques used today. As described above, and according to aspects of the embodiments, client verification, attribution, user authentication, access rights, and risk assessment all take place prior to accessing protected systems 220.

Figure 8:
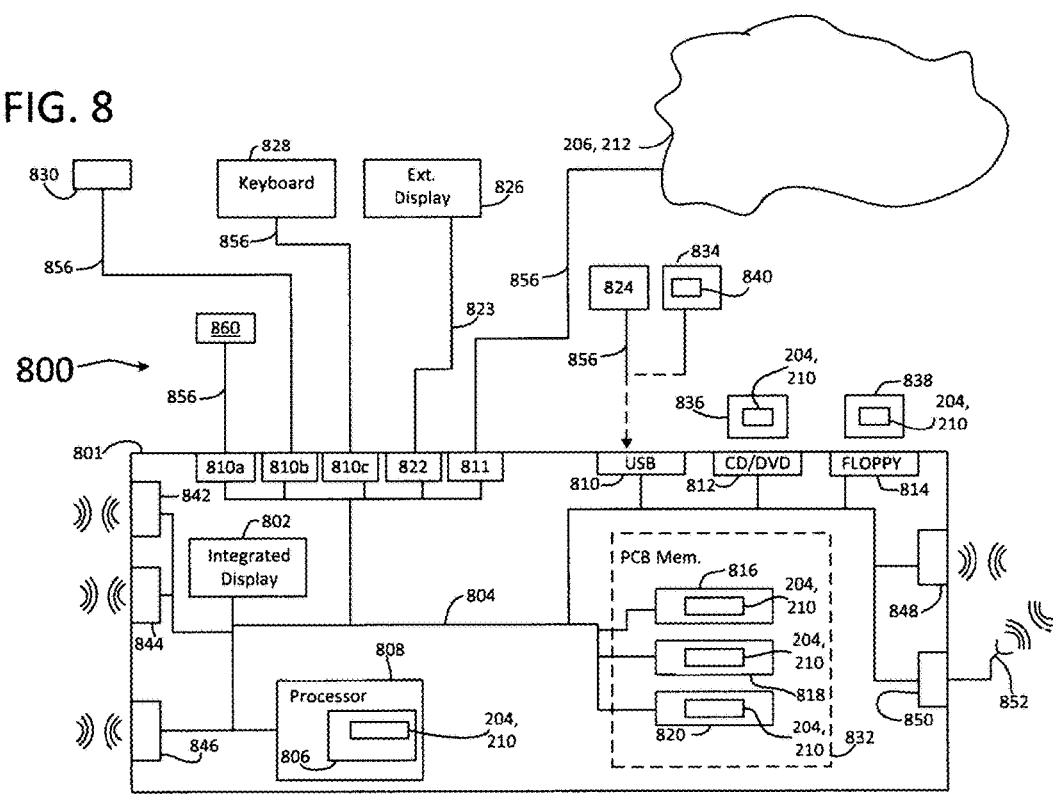
FIG. 8 illustrates a personal computer/laptop/server (herein after, "server") suitable for use to implement the method of FIG. 3, and message flow diagrams of FIGS. 4-7, within the network of FIG. 200 according to aspects of the embodiments.

FIG. 8 illustrates personal computer (PC)/laptop/Server (herein after, in the context of FIG. 8, "server" refers to both client side server 202, and GW side server 208, and collectively referred to as servers 202, 208) suitable for use to implement method 300 for authenticating identities using both network and transport layer L3/L4 protocols 106, 108 according to aspect of the embodiments. Server 202, 208 includes, among other items, shell/box 801, internal data/command bus (bus) 804, processor(s) 808 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 810, compact disk (CD)/digital video disk (DVD) read/write (R/W) drive 812, floppy diskette drive 814 (though less used currently, many servers still include this device), and data storage unit 832. According to further embodiments, a controller can be used in place or, or in conjunction with processor 808, wherein the controller can include one or more hardware components designed and/or fabricated to replicate the functionality of processor 808. According to still further embodiments, processor 808 and a controller can be used interchangeably or in combination to perform the processing functions described herein.

Data storage unit 832 itself can comprise hard disk drive (HDD) 816 (these can include conventional magnetic storage media, but, as is becoming increasingly more prevalent, can include flash drive-type mass storage devices 834, among other types), read-only memory (ROM) device(s) 818 (these can include electrically erasable (EE) programmable ROM (EEPROM) devices, ultra-violet erasable PROM devices (UVPROMs), among other types), and random access memory (RAM) devices 820. Usable with USB port 810 is flash drive device 834, and usable with CD/DVD R/W device 812 are CD/DVD disks 836 (which can be both read and write-able). Usable with floppy diskette drive device 814 are floppy diskettes 838. Each of the memory storage devices, or the memory storage media (816, 818, 820, 834, 836, and 838, among other types), can contain parts or components, or in its entirety, executable software programming code or applications, such as, by way of non-limiting example, one or more of client side auth. App 204 and GW side auth. App 210, according to aspects of the embodiments; in the context of FIG. 8, these Apps can be referred to collectively as Apps 204, 210, which can implement part or all of the portions of method 300 described herein. Further, processor 808 itself can contain one or different types of memory storage devices 806 (most probably, but not in a limiting manner, RAM memory storage media 820) that can store all or some of the components of App 204, 210.

In addition to the above described components, server 202, 208 also comprises keyboard 828, display 826, and mouse 830. All of these components are known to those of ordinary skill in the art, and this description includes all known and future variants of these types of devices. Display 826 can be any type of known display or presentation screen, such as liquid crystal displays (LCDs), light emitting diode displays (LEDs), plasma displays, cathode ray tubes (CRTs), among others. Server 202, 208 can include one or more user interface mechanisms such as a mouse, keyboard, microphone, touch pad, touch screen, voice-recognition system, among other inter-active inter-communicative devices.

External display 826 interfaces with server 202, 208 via video input/output (I/O) interface 822. Video I/O interface 822 can be one or more of an RS232, Ethernet, USB, video graphics array (VGA), high definition multimedia interface (HDMI) video/communications port, or can include all or some of these, and further includes any other type of communications means, presently known or further developed. Server 202, 208 can further include communications satellite/global positioning system (satellite) transceiver device 850 to which is electrically connected at least one antenna 852 (according to an embodiment, there can be at least one global positioning system (GPS) receive-only antenna, and at least one separate satellite bi-directional communications antenna). Server 202, 208 can access network(s) 206, 212, either through network port 811 directly, or wirelessly via Wi-Fi transceiver 842, 3G/4G/5G/LTE transceiver 848 and/or satellite transceiver device 850 (and their respective antennas) according to an embodiment. Server 202, 208 can also be part of a larger network configuration as in a GAN (e.g., internet 854), which ultimately allows connection to various landlines.

According to further embodiments, keyboard 828, mouse 830, and/or a touch panel provides a means for a user to enter commands and configuration into server 202, 208 (e.g., via a keyboard, buttons, switches, touch screen and/or joy stick). External display device 826 can be used to show visual representations of acquired data, and the status of programs/applications that can be running, among other things.

Bus 804 provides a data/command pathway for items such as: the transfer and storage of data/commands between processor 808, Wi-Fi transceiver 842, BlueTooth (BT) transceiver 844, NFC transceiver 846, internal display 802, I/O port 822, USB port 810, CD/DVD drive 812, floppy diskette drive 814, memory 832, 3G/4G/5G/LTE transceiver 848, and satellite transceiver device 850. Through bus 804, data can be accessed that is stored in data storage unit memory 832. Processor 808 can send information for visual display to external display 826, and the user can send commands to system operating programs/software/Apps 204, 210 that might reside in either processor 808.

Server 202, 208, and either processor internal memory 806, or processor board memory 832, can be used to implement method 300 for authenticating identities using both network and transport layer protocols according to aspect of the embodiments. Hardware, firmware, software or a combination thereof can be used to perform the various steps and operations described herein. According to an embodiment, App 204, 210 for carrying out the above discussed steps can be stored and distributed on multi-media storage devices such as devices 816, 818, 820, 834, 836 and/or 838 (described above) or other form of media capable of portably storing information, and storage media 834, 836 and/or 838 can be inserted into, and read by, devices such as USB port 810, CD-ROM drive 812, and disk drives 814, 816, among other types of software storage devices.

As also will be appreciated by one skilled in the art, the various functional aspects of the embodiments can be embodied in a network and computing devices. Accordingly, the embodiments can take the form of an entirely hardware embodiment or an embodiment combining hardware and software aspects. Further, the embodiments can take the form of a non-transitory computer program product stored on a computer-readable storage medium having computer-readable instructions embodied in the medium. Any suitable computer-readable medium can be utilized, including hard disks, CD-ROMs, DVDs, optical storage devices, or magnetic storage devices such a floppy disk or magnetic tape. Other non-limiting examples of computer-readable media include flash-type memories or other known types of memory storage devices.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that interfaces various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, DVD, or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or non-volatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable, volatile/non-volatile, and transitory/non-transitory computer storage media. For example, the processor can access a hard disk drive that reads from or writes-to non-removable, non-volatile, and non-transitory magnetic media, a magnetic disk drive that reads from or writes to a removable, non-volatile, and non-transitory magnetic disk, and/or an optical disk drive that reads from or writes to a removable, non-volatile, and non-transitory optical disk, such as a CD-ROM or other optical media. Other removable/non-removable, volatile/non-volatile, and non-transitory computer storage media that can be used in the operating environment include, but are not limited to, magnetic tape cassettes, flash memory cards, DVDs, digital video tape, solid state RAM, solid state ROM and the like. A HDD can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertain.

Figure 9:
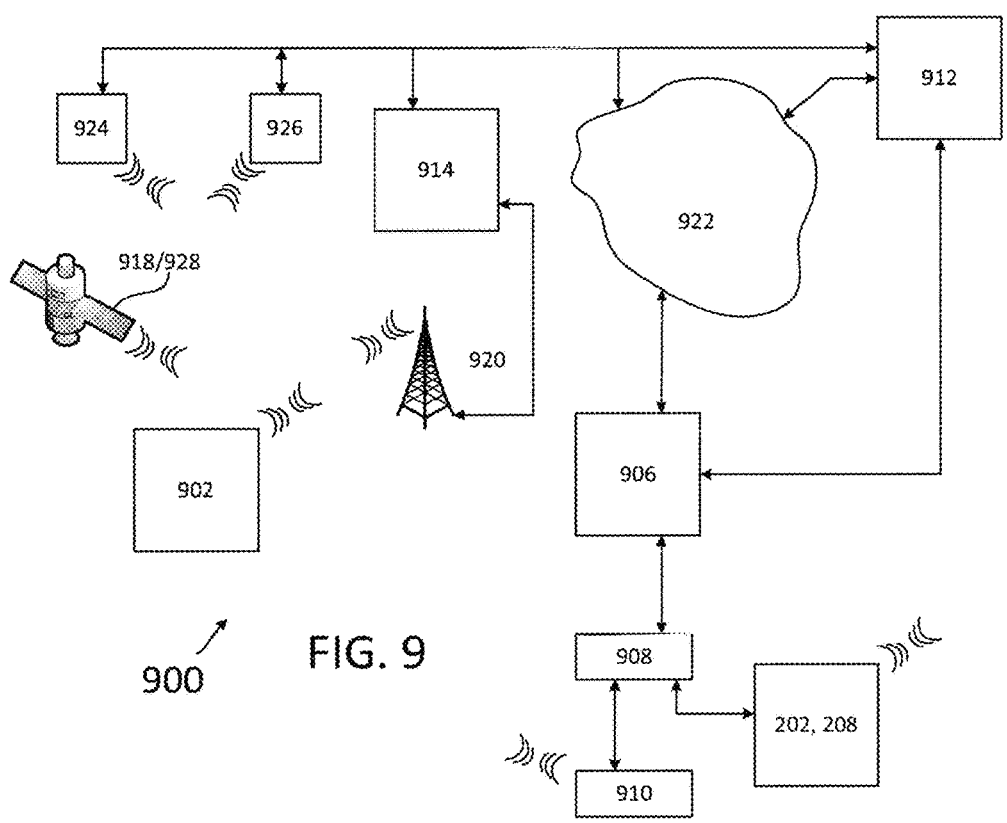
FIG. 9 illustrates a network within which the apparatus of FIGS. 2 and 8 can operate according to aspects of the embodiments.

FIG. 9 illustrates a network within which the apparatus of FIGS. 2 and 8 can operate according to aspects of the embodiments. FIG. 9 illustrates network system 900 (which can be substantially similar to either or both of first and second networks 206, 212) within which the system and method for authenticating identities using both network and transport layer protocols can be implemented according to aspects of the embodiments. Much of the network system infrastructure shown in FIG. 9 is or should be known to those of skill in the art, so, in fulfillment of the dual purposes of clarity and brevity, a detailed discussion thereof shall be omitted.

According to an embodiment, a user of the system and method 300 for authenticating identities using both network and transport layer protocols according to aspect of the embodiments could have client side auth. App 204 on their mobile device 902 or client devices 202, and GW side auth. App 210 can be stored on auth. server 208 according to aspects of the embodiments. Mobile devices 902 can include, but are not limited to, so-called smart phones, tablets, personal digital assistants, notebook and laptop computers, and essentially any device that can access the internet and/or cellular phone service or can facilitate transfer of the same type of data in either a wired or wireless manner. For purposes of this discussion, the user shall be discussed as using only client devices 202, though such discussion should be understood to be in a non-limiting manner in view of the discussion above about the other types of devices that can access, use, and provide such information.

As shown in FIG. 9, the user can use client device 202 to access cellular service provider 914, either through a wireless connection (cellular tower 920) or via a wireless/wired interconnection (a "Wi-Fi" system that comprises, e.g., modulator/demodulator (modem) 908, wireless router 910, internet service provider (ISP) 906, and networks 206, 212. Further, client devices 202 can include NFC, "Wi-Fi," and BT communications capabilities as well, all of which are known to those of skill in the art. To that end, network system 900 further includes, as many homes (and business enterprise locations) do, one or more client devices 202 that can be connected to wireless router 910 via a wired connection (e.g., modem 908) or via a wireless connection (e.g., Bluetooth).

Modem 908 can be connected to ISP 906 to provide internet based communications in the appropriate format to end users, and which takes signals from the end users and forwards them to ISP 906. Such communication pathways are well known and understand by those of skill in the art, and a further detailed discussion thereof is therefore unnecessary.

Client devices 202 can also access GPS satellite 928, which is controlled by GPS station 924, to obtain positioning information (which can be useful for different aspects of the embodiments), or client devices 202 can obtain positioning information via cellular service provider 914 using cell tower(s) 920 according to one or more well-known methods of position determination. Some client devices 202 can also access communication satellites 918 and their respective satellite communication systems control stations 926 (the satellite in FIG. 9 is shown common to both communications and GPS functions) for near-universal communications capabilities, albeit at a much higher cost than convention "terrestrial" cellular services. Client devices 202 can also obtain positioning information when near or internal to a building (or arena/stadium) through the use of one or more of NFC/BT devices, the details of which are known to those of skill in the art. FIG. 9 also illustrates other components of network system 900 such as plain old telephone service (POTS) provider 912.

As described above, an encoding process is discussed in reference to FIGS. 3-7. The encoding process is not meant to limit the aspects of the embodiments, or to suggest that the aspects of the embodiments should be implemented following the encoding process. The purpose of the encoding process described herein is to facilitate the understanding of one or more aspects of the embodiments and to provide the reader with one or many possible implementations of the processed discussed herein. FIG. 3 illustrates a flowchart of various steps performed during the encoding process. The steps of FIG. 3 are not intended to completely describe the encoding process but only to illustrate some of the aspects discussed above.

The disclosed embodiments provide a source array, computer software, and method 300 for authenticating identities using both network and transport layer protocols according to aspect of the embodiments. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A method for authenticating a user within a computer network, the computer network operating in conformance with an open source initiative (OSI) model of structuring protocol data unit messages, the method comprising:
   generating a connection request at a client side server, the connection request including
      (i) a client side network layer protocol address information for use in a network layer (L3) protocol data unit (PDU), and
      (ii) a client side transport layer protocol address information for use in a transport layer (L4) PDU;
   transmitting the connection request from the client side server using both the network layer and the transport layer;
   receiving at the client side server an authentication call message on both the network and transport layers using the client side network layer protocol address information and client side transport layer protocol address information;
   transmitting user authentication information in response to the received authentication call message; and
   receiving connection confirmation based on the transmitted user authentication information confirming the user is authenticated to access protected systems.

2. The method according to claim 1, wherein the step of generating a connection request comprises:
   accessing a client side authentication application on the client side server by the user;
   obtaining a security token from the client side server through use of the client side authentication application;
   determining, by the client side authentication application, that the security token is valid and unexpired; and
   combining the valid, unexpired token with the connection request by the client side authentication application.

3. The method according to claim 1, wherein the step of receiving at the client side server an authentication call message comprises:
   receiving, at a gateway side server, the transmitted connection request;
   determining, by a gateway side authentication application, the
      (i) a client side network layer protocol address information for use in a network layer (L3) protocol data unit (PDU), and
      (ii) a client side transport layer protocol address information for use in a transport layer (L4) PDU;
   verifying token authentication of the user using the gateway side authentication application;
   generating the authentication call message; and transmitting the authentication call message to the client side authentication application on the client side server using both the network layer and transport layer according to the client side network layer protocol address information and client side transport layer protocol address information.

4. The method according to claim 1, wherein the step transmitting user authentication information in response to the received authentication call message comprises:
requesting, by the client side authentication application, authentication information from the user;
receiving as an input to a graphical user interface the authentication information from the user; and
forwarding the same to the gateway side server using a completion of user authentication message.

5. The method according to claim 4, wherein the user authentication information comprises:
at least one or more of a username, password, answers to one or more additional questions, and biometric information.

6. The method according to claim 4, further comprising:
receiving, by the gateway server and gateway authentication application, the authentication information transmitted by the client side server and client side authentication application; and
forwarding, by the gateway side server and the gateway side authentication application, the connection request to one or more of the protected systems.

7. The method according to claim 6, further comprising:
completing connection confirmation between the one or more protected systems and the client side server.

8. The method according to claim 1, wherein
a virtual private network (VPN) is created between the client side server, a gateway side server, and protected systems, the VPN being used to access protected systems by the client side server, and the VPN operating within a larger computer network.

9. A method for authenticating access to computer network protected systems, the method comprising:
determining that a user has a valid, non-expired token to allow access to the protected systems;
granting access to the user to protected systems; and
accessing the protected systems by the user, wherein the steps of determining that the user has a valid, non-expired token comprises—
generating a connection request at a client side server to the protected systems, the connection request including
(i) a client side network layer protocol address information for use in a network layer (L3) protocol data unit (PDU), and
(ii) a client side transport layer protocol address information for use in a transport layer (L4) PDU;
transmitting the connection request from the client side server using both the network layer and the transport layer;
receiving at the client side server an authentication call message on both the network and transport layers using the client side network layer protocol address information and client side transport layer protocol address information;
transmitting user authentication information in response to the received authentication call message; and
receiving connection confirmation based on the transmitted user authentication information confirming the user is authenticated to access the protected systems.

10. The method according to claim 9, further comprising:
requesting authentication credentials from the user if the token is in-valid or expired; and
permitting access to the protected systems if the authentication credentials are correct.

11. The method according to claim 10, further comprising:
determining whether the user is an authorized user if the authentication credentials are correct by verifying additional information.

12. The method according to claim 11, wherein the additional information comprises:
one or more of a password, username, biometric information, and one or more answers to one or more security questions.

13. A network system for authenticating a user of a computer network that operates in conformance with an open source initiative (OSI) model of structuring protocol data unit messages, the network system comprising:
a client side server, adapted to store and run a client side authentication application, the client side authentication application adapted to generate a connection request at the client side server to access the protected systems, the connection request including
(i) a client side network layer protocol address information for use in a network layer (L3) protocol data unit (PDU), and
(ii) a client side transport layer protocol address information for use in a transport layer (L4) PDU,
the client side authentication application further adapted to transmit the connection request from the client side server using both the network layer and the transport layer;
the client side authentication application further adapted to receive an authentication call message on both the network and transport layers using the client side network layer protocol address information and client side transport layer protocol address information,
the client side authentication application further adapted to transmit user authentication information in response to the received authentication call message, and
the client side authentication application further adapted to receive connection confirmation based on the transmitted user authentication information confirming the user is authenticated to access the protected systems.

14. The network system according to claim 13, wherein the client side authentication application further adapted to obtain a security token from the client side server;
determine that the security token is valid and unexpired; and
combine the valid, unexpired token with the connection request.

15. The network system according to claim 13, further comprising;
a gateway side server adapted to include a gateway side authentication application, the gateway side authentication application adapted to receive the transmitted connection request, and determine the
(i) a client side network layer protocol address information for use in a network layer (L3) protocol data unit (PDU), and
(ii) a client side transport layer protocol address information for use in a transport layer (L4) PDU, the gateway side authentication application further adapted to verify the token authentication of the user, generate the authentication call message (1104), and transmit the authentication call message to the client side authentication application on the client side server using both the network layer and transport layer according to the client side network layer protocol address information and client side transport layer protocol address information.

16. The network system according to claim 13, wherein the client side authentication application further adapted to
request authentication information from the user,
receive, as an input to a graphical user interface, the authentication information from the user, and
forward the same to the gateway side server using a completion of user authentication message.

17. The network system according to claim 16, wherein the user authentication information comprises:
at least one or more of a username, password, answers to one or more additional questions, and biometric information.

18. The network system according to claim 16, wherein the gateway side authentication application is further adapted to
receive the authentication information transmitted by the client side server and client side authentication application, and
forward the connection request to one or more of the protected systems.

19. The network system according to claim 18, wherein the client side server, client side authentication application, gateway side server, and gateway side authentication application are further adapted to complete connection confirmation between the one or more protected systems and the client side server.

20. The network system according to claim 13, wherein a virtual private network (VPN) is created between the client side server, a gateway side server, and protected systems, the VPN being used to access protected systems by the client side server, and the VPN operating within a larger computer network.

* * * * *